United States Patent
Vencill et al.

(10) Patent No.: US 8,172,913 B2
(45) Date of Patent: May 8, 2012

(54) ARRAY OF PLANAR MEMBRANE MODULES FOR PRODUCING HYDROGEN

(76) Inventors: Thomas R. Vencill, Albuquerque, NM (US); Anand S. Chellappa, Albuquerque, NM (US); Shailendra B. Rathod, Hillsboro, OR (US)

(*) Notice: Subject to any disclaimer, the term of this patent is extended or adjusted under 35 U.S.C. 154(b) by 261 days.

(21) Appl. No.: 12/407,705

(22) Filed: Mar. 19, 2009

(65) Prior Publication Data

US 2010/0068132 A1    Mar. 18, 2010

Related U.S. Application Data

(63) Continuation-in-part of application No. 11/109,186, filed on Apr. 18, 2005, now Pat. No. 7,527,661, which is a continuation-in-part of application No. 10/476,015, filed as application No. PCT/US02/12822 on Apr. 23, 2002, now Pat. No. 7,811,529.

(51) Int. Cl.
*B01J 7/00*    (2006.01)
*C01B 3/36*    (2006.01)
*B01D 53/22*    (2006.01)
*B01D 59/12*   (2006.01)

(52) U.S. Cl. ........... 48/61; 48/197 R; 96/4; 96/7; 95/43; 95/55

(58) Field of Classification Search .......... 48/61; 95/43, 95/56; 96/4, 7
See application file for complete search history.

(56) References Cited

U.S. PATENT DOCUMENTS

| | | | |
|---|---|---|---|
| 3,480,419 A | 11/1969 | Louis et al. | |
| 3,505,027 A | 4/1970 | Breitbach et al. | |
| 3,682,142 A | 8/1972 | Newkirk | |
| 3,907,511 A | 9/1975 | Forbes et al. | |
| 4,088,450 A | 5/1978 | Kosaka et al. | |
| 4,098,587 A | 7/1978 | Krar et al. | |
| 4,098,588 A | 7/1978 | Buswell et al. | |
| 4,098,589 A | 7/1978 | Buswell et al. | |
| 4,106,439 A | 8/1978 | Kanao | |
| 4,113,838 A | 9/1978 | Koike et al. | |
| 4,155,712 A | 5/1979 | Taschek | |
| 4,157,270 A | 6/1979 | Martignoni et al. | |
| 4,211,537 A | 7/1980 | Teitel | |
| 4,248,941 A | 2/1981 | Louis et al. | |
| 4,293,315 A | 10/1981 | Sederquist | |
| 4,438,082 A | 3/1984 | Dettling | |
| 4,454,207 A | 6/1984 | Frioli et al. | |
| 4,624,841 A | 11/1986 | Hidaki | |
| 4,650,727 A | 3/1987 | Vanderborgh et al. | |
| 4,670,359 A | 6/1987 | Beshty et al. | |
| 4,692,306 A | 9/1987 | Minet et al. | |
| 4,737,161 A | 4/1988 | Szydiowski et al. | |
| 4,746,329 A | 5/1988 | Christner et al. | |
| 4,761,164 A | 8/1988 | Pez et al. | |

(Continued)

FOREIGN PATENT DOCUMENTS

DE    39 26 466 C 2    12/1996

(Continued)

*Primary Examiner* — Matthew Merkling

(74) *Attorney, Agent, or Firm* — Baker & Hostetler LLP

(57) ABSTRACT

A shared or common environment membrane reactor containing a plurality of planar membrane modules with top and bottom thin foil membranes supported by both an intermediary porous support plate and a central base which has both solid extended members and hollow regions or a hollow region whereby the two sides of the base are in fluid communication. The membrane reactor operates at elevate temperatures for generating hydrogen from hydrogen rich feed fuels.

8 Claims, 23 Drawing Sheets

U.S. PATENT DOCUMENTS

| | | | |
|---|---|---|---|
| 4,781,214 A | 11/1988 | Scaramucci | |
| 4,781,241 A | 11/1988 | Misage et al. | |
| 4,861,347 A | 8/1989 | Szydiowski et al. | |
| 4,933,242 A | 6/1990 | Koga et al. | |
| 5,015,444 A | 5/1991 | Koga et al. | |
| 5,084,363 A | 1/1992 | Reiser | |
| 5,215,729 A | 6/1993 | Buxbaum | |
| 5,221,524 A | 6/1993 | Eguchi | |
| 5,222,551 A | 6/1993 | Hasegawa et al. | |
| 5,360,461 A | 11/1994 | Meinzer | |
| 5,389,230 A | 2/1995 | Veluswamy | |
| 5,432,023 A | 7/1995 | Yamada et al. | |
| 5,601,937 A | 2/1997 | Isenberg | |
| 5,609,834 A | 3/1997 | Hamada et al. | |
| 5,612,012 A | 3/1997 | Soma et al. | |
| 5,618,322 A | 4/1997 | Mizuno et al. | |
| 5,631,099 A | 5/1997 | Hockaday | |
| 5,641,585 A | 6/1997 | Lessing et al. | |
| 5,648,182 A | 7/1997 | Hara et al. | |
| 5,652,020 A | 7/1997 | Collins et al. | |
| 5,676,911 A | 10/1997 | Baumert et al. | |
| 5,686,196 A | 11/1997 | Singh et al. | |
| 5,702,491 A | 12/1997 | Long et al. | |
| 5,733,347 A | 3/1998 | Lesieur | |
| 5,741,474 A | 4/1998 | Isomura et al. | |
| 5,746,985 A | 5/1998 | Takahashi | |
| 5,759,712 A | 6/1998 | Hockaday | |
| 5,776,421 A | 7/1998 | Matsumura et al. | |
| 5,780,179 A | 7/1998 | Okamoto | |
| 5,811,062 A | 9/1998 | Wegeng et al. | |
| 5,858,314 A | 1/1999 | Hsu et al. | |
| 5,861,137 A | 1/1999 | Edlund | |
| 5,888,273 A | 3/1999 | Buxbaum | |
| 5,897,970 A | 4/1999 | Isomura et al. | |
| 5,938,800 A | 8/1999 | Verrill et al. | |
| 5,942,346 A | 8/1999 | Ahmed et al. | |
| 5,961,932 A | 10/1999 | Ghosh et al. | |
| 5,976,725 A | 11/1999 | Gamo et al. | |
| 5,980,726 A | 11/1999 | Moulthrop, Jr. et al. | |
| 5,997,594 A | 12/1999 | Edlund et al. | |
| 6,007,606 A | 12/1999 | Baksh et al. | |
| 6,007,699 A | 12/1999 | Cole | |
| 6,045,933 A | 4/2000 | Okamoto | |
| 6,057,051 A | 5/2000 | Uchida et al. | |
| 6,083,425 A | 7/2000 | Clawson et al. | |
| 6,096,286 A | 8/2000 | Autenriieth | |
| 6,103,143 A | 8/2000 | Sircar et al. | |
| 6,103,441 A | 8/2000 | Matsubayashi et al. | |
| 6,122,909 A | 9/2000 | Murphy et al. | |
| 6,126,723 A | 10/2000 | Drost et al. | |
| 6,126,908 A | 10/2000 | Clawson et al. | |
| 6,129,861 A | 10/2000 | Muesinger et al. | |
| 6,152,987 A | 11/2000 | Ma et al. | |
| 6,152,995 A | 11/2000 | Edlund | |
| 6,159,434 A | 12/2000 | Gonjo et al. | |
| 6,171,574 B1 | 1/2001 | Juda et al. | |
| 6,180,846 B1 | 1/2001 | Dandekar et al. | |
| 6,183,703 B1 | 2/2001 | Hsu et al. | |
| 6,183,895 B1 | 2/2001 | Kudo et al. | |
| 6,190,124 B1 | 2/2001 | Romatier | |
| 6,190,623 B1 | 2/2001 | Sanger et al. | |
| 6,192,596 B1 | 2/2001 | Bennett et al. | |
| 6,200,536 B1 | 3/2001 | Tonkovich et al. | |
| 6,207,122 B1 | 3/2001 | Clawson et al. | |
| 6,207,132 B1 | 3/2001 | Lin et al. | |
| 6,221,117 B1 | 4/2001 | Edlund et al. | |
| 6,231,831 B1 | 5/2001 | Autenrieth et al. | |
| 6,232,005 B1 | 5/2001 | Pettit | |
| 6,238,465 B1 | 5/2001 | Juda et al. | |
| 6,242,120 B1 | 6/2001 | Herron | |
| 6,244,367 B1 | 6/2001 | Ahmed et al. | |
| 6,245,303 B1 | 6/2001 | Bentley et al. | |
| 6,245,309 B1 | 6/2001 | Etievant et al. | |
| 6,254,839 B1 | 7/2001 | Clawson et al. | |
| 6,254,848 B1 | 7/2001 | Autenrieth et al. | |
| 6,264,856 B1 | 7/2001 | Autenrieth et al. | |
| 6,268,077 B1 | 7/2001 | Kelley et al. | |
| 6,269,625 B1 | 8/2001 | Dibble et al. | |
| 6,274,093 B1 | 8/2001 | Long et al. | |
| 6,280,864 B1 | 8/2001 | Towler et al. | |
| 6,284,398 B1 | 9/2001 | Kiryu | |
| 6,294,276 B1 | 9/2001 | Ogino | |
| 6,296,814 B1 | 10/2001 | Bonk et al. | |
| 6,299,744 B1 | 10/2001 | Narayanan et al. | |
| 6,299,994 B1 | 10/2001 | Towler et al. | |
| 6,319,306 B1 | 11/2001 | Edlund et al. | |
| 6,326,097 B1 | 12/2001 | Hockaday | |
| 6,329,091 B1 | 12/2001 | James | |
| 6,331,281 B1 | 12/2001 | Teru et al. | |
| 6,338,913 B1 | 1/2002 | Eshraghi | |
| 6,348,278 B1 | 2/2002 | LaPierre et al. | |
| 6,350,297 B1 | 2/2002 | Doyle et al. | |
| 6,352,792 B1 | 3/2002 | Parchamazad | |
| 6,368,735 B1 | 4/2002 | Lomax et al. | |
| 6,372,363 B1 | 4/2002 | Krueger | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,413,479 B1 | 7/2002 | Kudo et al. | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,465,118 B1 | 10/2002 | Dickman et al. | |
| 6,470,569 B1 | 10/2002 | Lippert et al. | |
| 6,488,900 B1 | 12/2002 | Call et al. | |
| 6,503,298 B1 | 1/2003 | Monzyk et al. | |
| 6,627,338 B2 | 9/2003 | St-Pierre et al. | |
| 6,653,005 B1 | 11/2003 | Muradov | |
| 6,869,707 B2 | 3/2005 | Edlund et al. | |
| 7,048,897 B1 | 5/2006 | Koripella et al. | |
| 7,056,369 B2 | 6/2006 | Beisswenger et al. | |
| 7,077,643 B2 | 7/2006 | Holladay et al. | |
| 2001/0000380 A1 | 4/2001 | Buxbaum | |
| 2001/0018140 A1 | 8/2001 | Hermann et al. | |
| 2001/0021359 A1 | 9/2001 | Johnston | |
| 2001/0045061 A1 | 11/2001 | Edlund et al. | |
| 2001/0045364 A1 | 11/2001 | Hockaday et al. | |
| 2001/0049038 A1 | 12/2001 | Dickman et al. | |
| 2001/0053472 A1 | 12/2001 | Edlund | |
| 2002/0000066 A1 | 1/2002 | Bentley et al. | |
| 2002/0000067 A1 | 1/2002 | Numata et al. | |
| 2002/0006369 A1 | 1/2002 | Buxbaum | |
| 2002/0007594 A1 | 1/2002 | Muradov | |
| 2002/0021992 A1 | 2/2002 | Bass et al. | |
| 2002/0022167 A1 | 2/2002 | Herron | |
| 2002/0025458 A1 | 2/2002 | Faville et al. | |
| 2002/0028171 A1 | 3/2002 | Goetsch et al. | |
| 2002/0071976 A1 | 6/2002 | Edlund | |
| 2002/0083645 A1 | 7/2002 | Edlund | |
| 2002/0083829 A1 | 7/2002 | Edlund et al. | |
| 2002/0114762 A1 | 8/2002 | Wong et al. | |
| 2002/0114984 A1 | 8/2002 | Edlund et al. | |
| 2002/0116872 A1 | 8/2002 | Edlund et al. | |
| 2002/0119353 A1 | 8/2002 | Edlund et al. | |
| 2002/0127445 A1 | 9/2002 | Carpenter et al. | |
| 2002/0127447 A1 | 9/2002 | Edlund et al. | |
| 2002/0146604 A1 | 10/2002 | Matoba | |
| 2003/0068269 A1 | 4/2003 | Matzakos et al. | |
| 2003/0191199 A1 | 10/2003 | O'Rear | |
| 2003/0205138 A1 | 11/2003 | Edlund et al. | |
| 2003/0232224 A1 | 12/2003 | Kordesch et al. | |
| 2004/0154223 A1 | 8/2004 | Powell et al. | |
| 2004/0187386 A1 | 9/2004 | Wangerow et al. | |
| 2004/0191137 A1 | 9/2004 | Chellappa | |
| 2004/0194626 A1 | 10/2004 | Chellappa et al. | |
| 2004/0219423 A1 | 11/2004 | Tunney et al. | |
| 2005/0016729 A1 | 1/2005 | Savage | |
| 2005/0022448 A1 | 2/2005 | Kaye | |
| 2005/0039400 A1 | 2/2005 | Lau et al. | |
| 2005/0042165 A1 | 2/2005 | Akiyama et al. | |
| 2005/0244684 A1 | 11/2005 | Koripella | |
| 2006/0260466 A1* | 11/2006 | Tanaka et al. | 95/11 |

FOREIGN PATENT DOCUMENTS

| | | |
|---|---|---|
| DE | 19902926 A1 | 3/2000 |
| EP | 0 615 949 | 9/1994 |
| EP | 0 861 802 A2 | 2/1998 |

| | | | |
|---|---|---|---|
| EP | 0 906 890 A1 | 4/1999 |
| EP | 1 061 039 | 12/2000 |
| EP | 1 167 283 | 1/2002 |
| EP | 1208904 A | 5/2002 |
| GB | 97 21 66 | 10/1964 |
| JP | 54023942 | 2/1979 |
| JP | 0119166 | 7/1983 |
| JP | 05078810 A | 3/1993 |
| JP | 10330992 | 12/1998 |
| JP | 411255501 A | 9/1999 |
| JP | 02000159502 A | 6/2000 |
| JP | 02000281312 A | 10/2000 |
| JP | 2004502623 T | 1/2004 |
| JP | 2004525058 T | 8/2004 |
| WO | WO 96/29751 | 9/1996 |
| WO | WO 97/17125 | 5/1997 |
| WO | WO 98/00878 | 1/1998 |
| WO | WO 99/17867 | 4/1999 |
| WO | WO 99/43610 | 9/1999 |
| WO | WO 99/64146 | 12/1999 |
| WO | WO 99/66279 | 12/1999 |
| WO | WO 00/78434 A | 12/2000 |
| WO | WO 01/12539 | 2/2001 |
| WO | WO 01/26174 | 4/2001 |
| WO | WO 01/50541 | 7/2001 |
| WO | WO 01/77011 | 10/2001 |
| WO | WO 02/071451 A2 | 9/2002 |
| WO | WO 02/086987 A2 | 10/2002 |
| WO | WO 03/027006 | 4/2003 |
| WO | WO 03/035547 A1 | 5/2003 |
| WO | WO 03/055585 | 7/2003 |
| WO | WO2004091766 A2 | 3/2004 |
| WO | WO2005004256 A2 | 1/2005 |
| WO | WO 2005/026043 | 3/2005 |

\* cited by examiner

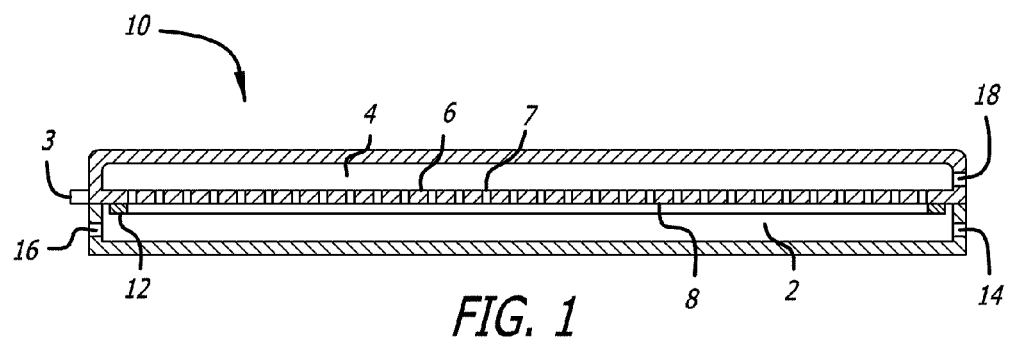
FIG. 1
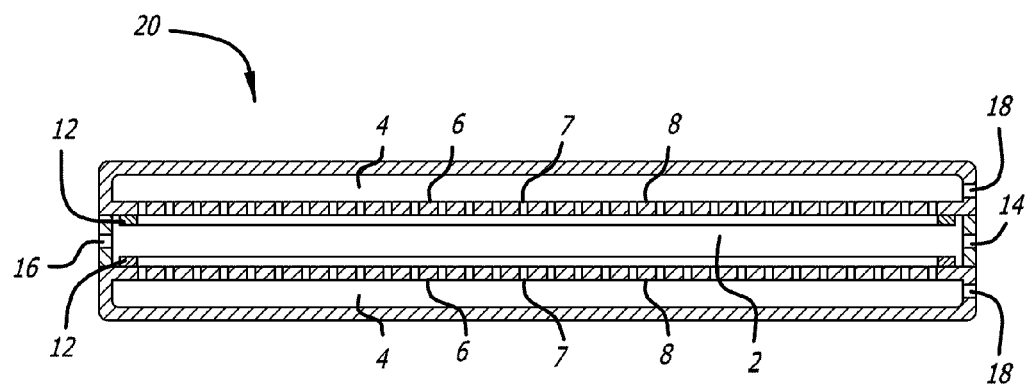
FIG. 2
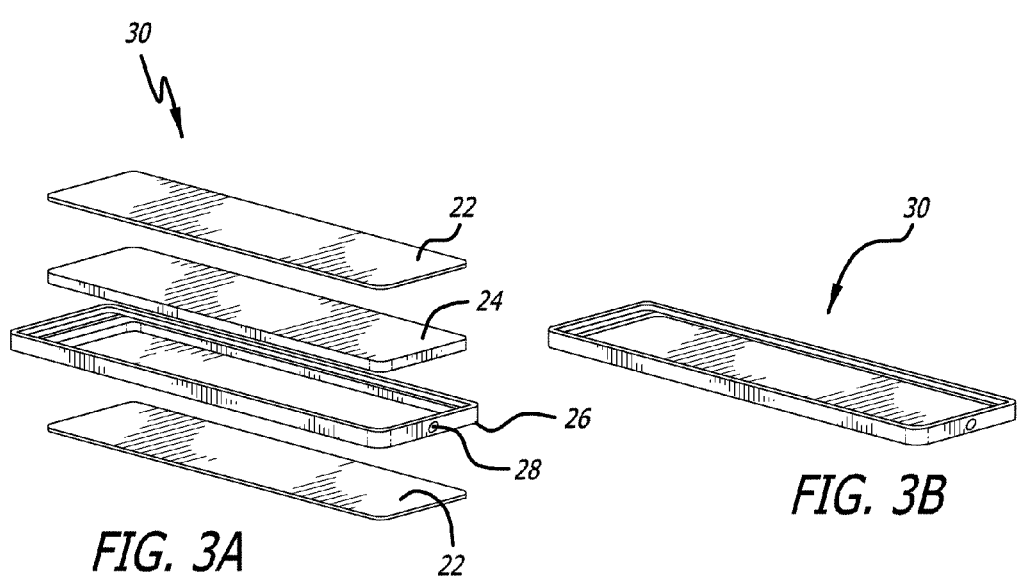
FIG. 3A
FIG. 3B

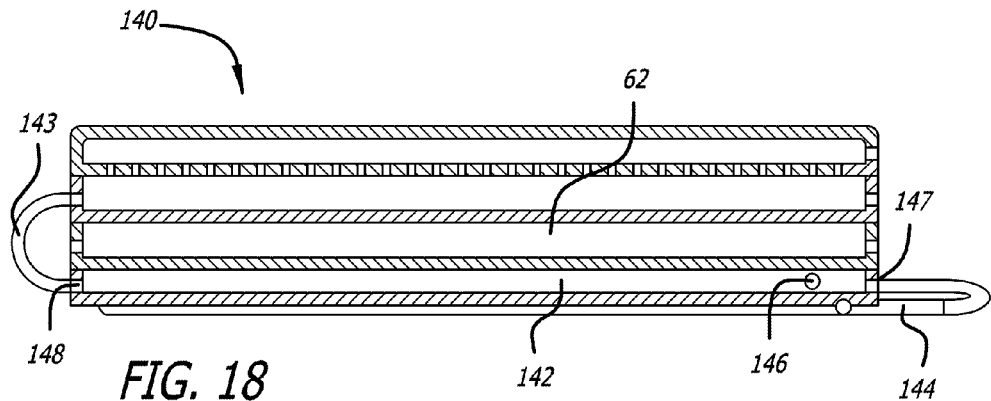
FIG. 18
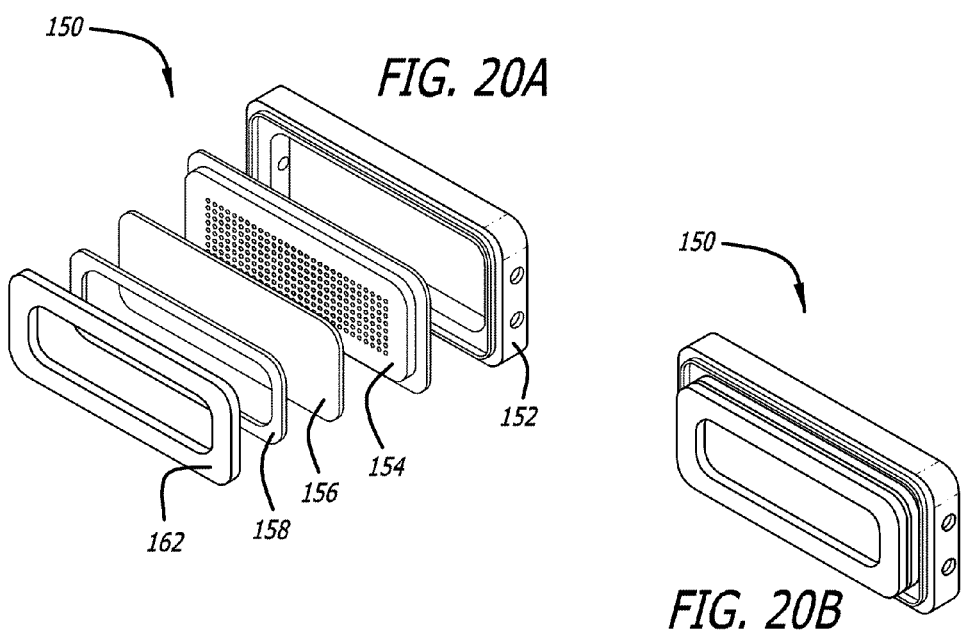
FIG. 20A
FIG. 20B
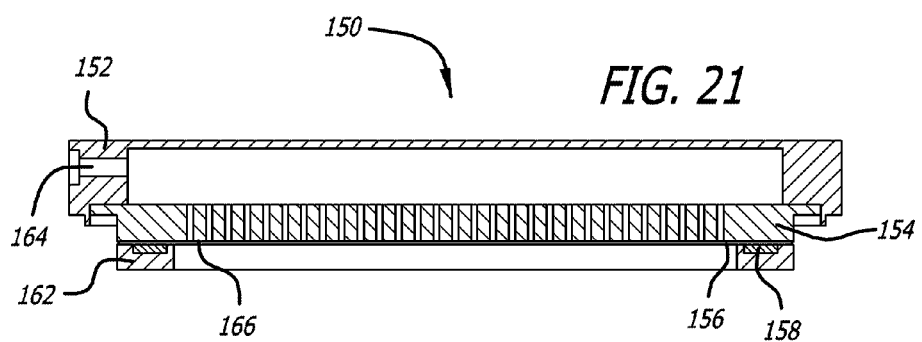
FIG. 21

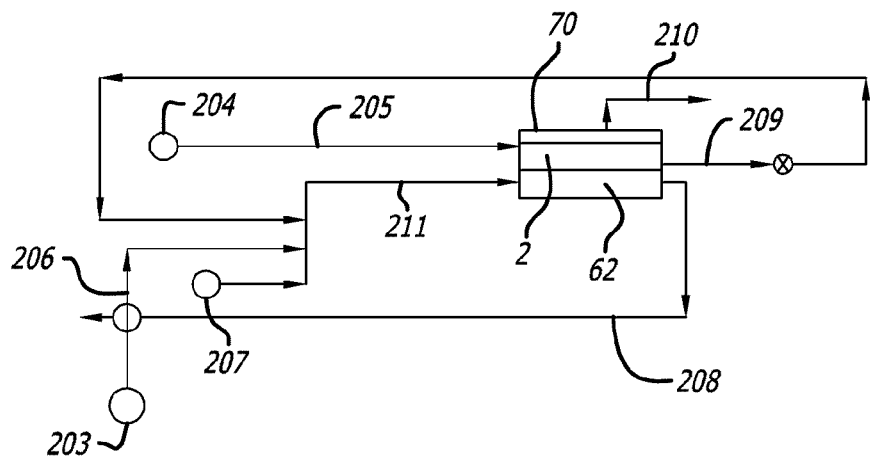
FIG. 24
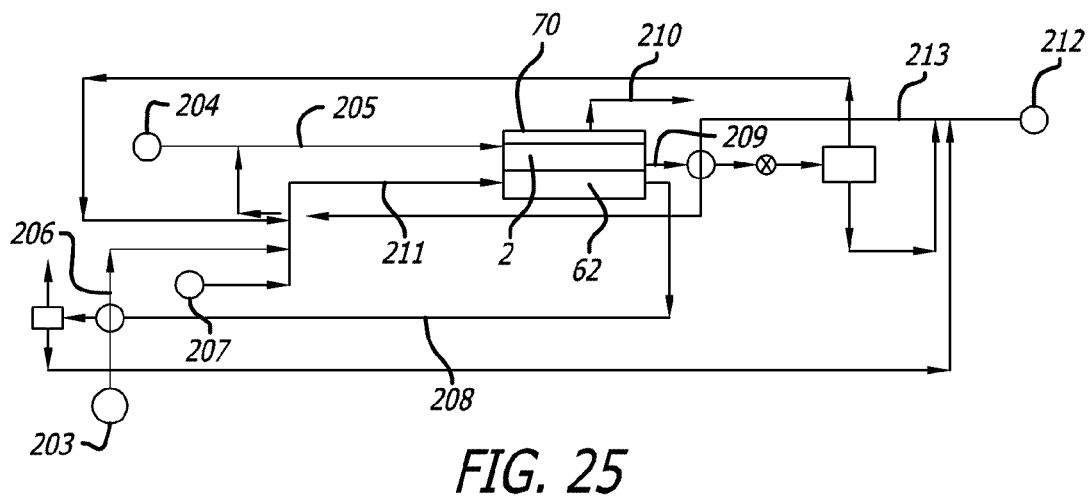
FIG. 25
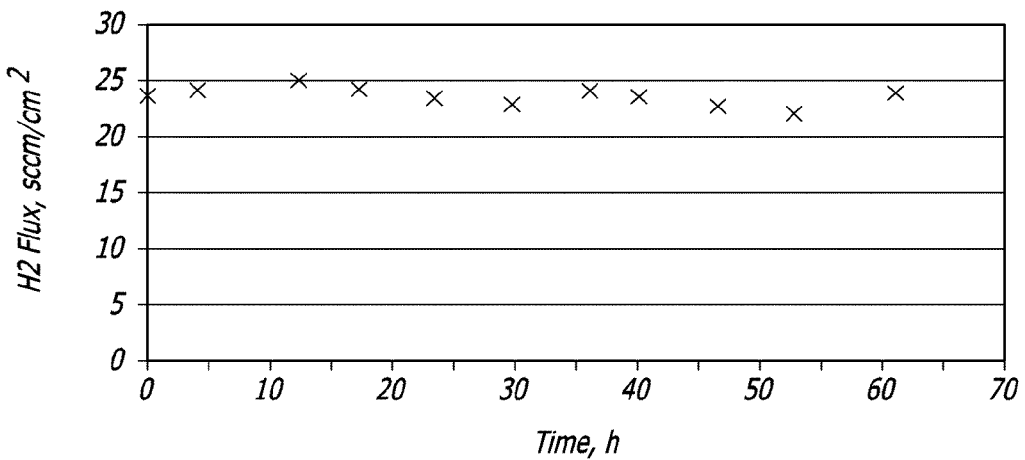

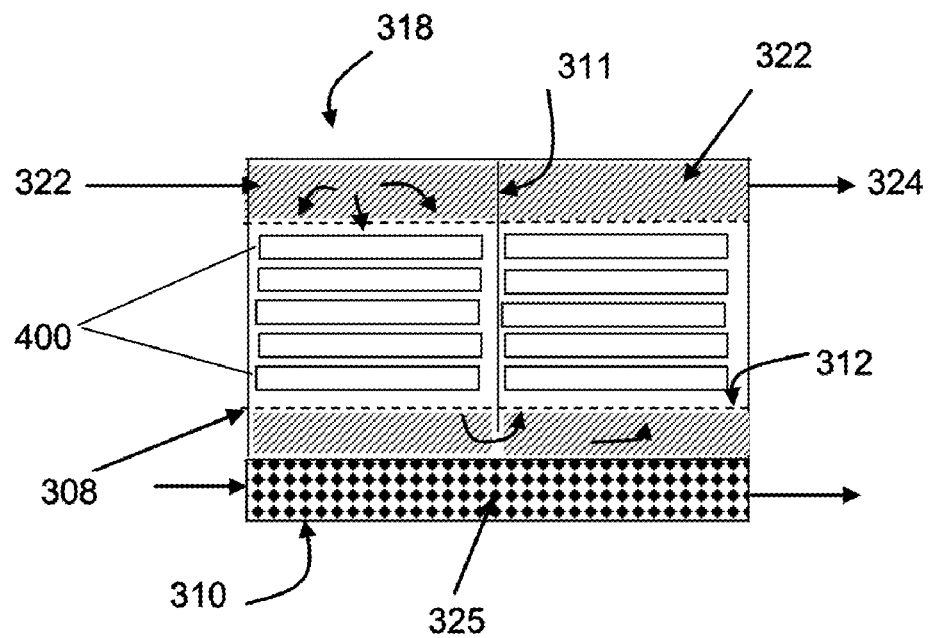
FIG. 45
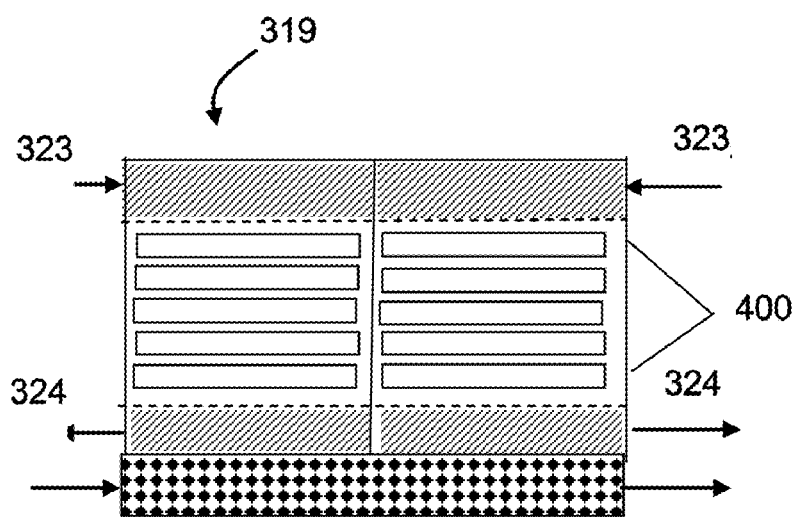
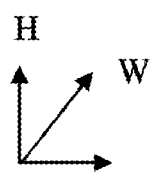
FIG. 46

ARRAY OF PLANAR MEMBRANE MODULES FOR PRODUCING HYDROGEN

RELATED APPLICATIONS

This application is a continuation-in-part of U.S. application Ser. No. 11/109,186, filed on Apr. 18, 2005 now U.S. Pat. No. 7,527,661 which is a continuation-in-part and which is a continuation-in-part of U.S. application Ser. No. 10/476,015 filed on Apr. 27, 2004, now U.S. Pat. No. 7,811,529 entitled "Hydrogen Generation Apparatus And Method For Using Same", which is a national phase filing of PCT International Application No. PCT/US02/12822, filed on Apr. 23, 2002, all of which are herein incorporated by reference in their entirety.

STATEMENT REGARDING FEDERALLY SPONSORED RESEARCH OR DEVELOPMENT

The disclosure was partly made with Government support under contract No. DE-FG36-07G017013 by the Department of Energy. The Government has certain rights in the disclosure.

BACKGROUND

This disclosure relates to hydrogen generating reactors and to hydrogen separation membranes.

DESCRIPTION OF RELATED ART

The growing popularity of portable electronic devices has produced an increased demand for compact and correspondingly portable electrical power sources to energize these devices. Developments in robotics and other emerging technology applications are further increasing the demand for small, independent power sources. At present, storage or rechargeable batteries are typically used to provide independent electrical power sources for portable devices. However, the amount of energy that can be stored in storage or rechargeable batteries is insufficient to meet the need of certain applications.

Hydrogen/air fuel cells (H/AFCs) have enormous potential as a replacement for batteries. Because they can operate on very energy-dense fuels, fuel cell-based power supplies offer high energy-to-weight ratios compared with even state-of-the-art batteries. Fuel cells are of particular interest to the military, where significant efforts are being made to reduce the weight of power supplies that soldiers must carry to support high-tech, field-portable equipment. There is also considerable potential for utilizing fuel cell-based power supplies for commercial applications, particularly for portable applications where small size and low weight are desirable.

A common H/AFC is a polymer electrolyte membrane (PEM) fuel cell. PEM fuel cells are constructed of an anode and a cathode separated by a polymer electrolyte membrane. Functionally, fuel cells generate electricity by reacting hydrogen with oxygen to produce water. Since oxygen can typically be obtained from the ambient atmosphere, only a source of hydrogen must be provided to operate a fuel cell. Merely providing compressed hydrogen is not always a viable option, because of the substantial volume that even a highly compressed gas occupies. Liquid hydrogen, which occupies less volume, is a cryogenic liquid, and a significant amount of energy is required to achieve the extremely low temperatures required to liquefy gaseous hydrogen. Furthermore, there are safety issues involved with the handling and storage of hydrogen in the compressed gas form or in the liquid form.

One method of producing hydrogen is by processing hydrocarbons such as methane (natural gas), propane, butane, and liquid fuels such as gasoline, diesel and JP-8 or oxygenates such as methanol. The choice of fuel and the choice of the method of processing, such as steam reforming, partial oxidation, and autothermal reforming, depends to a large extent on the type of service, such as, portable, stationary or automotive.

Hydrogen can also be produced by cracking ammonia. The product stream from the fuel processor when a hydrocarbon fuel is used contains hydrogen in addition to unreacted hydrocarbons, other products such as CO, $CO_2$, and diluents such as nitrogen. In essence, the hydrogen concentration in the product stream can be in the 40 to 75 volumetric percent range depending on the type of fuel and the method of processing. Methods such as water gas shift and preferential oxidation are used to reduce the CO concentrations to acceptable levels of no more than 50 parts per million, but increase the complexity of the system.

Accordingly, it is desirable to develop a method to yield an efficient and low cost supply of pure hydrogen for fuel cells and other applications.

SUMMARY OF THE DISCLOSURE

The present disclosure describes a planar hydrogen separation membrane module that is capable of handling high temperatures typically associated with steam reforming environments (600-700° C. and pressures up to 200 psig) for production of high purity hydrogen. The membrane module is compact, lightweight, and scalable, uses low cost fabrication and assembly processes, and can be utilized in a variety of configurations inside membrane reformers, including an array configuration. The simultaneous realization of hydrogen production and hydrogen separation in a membrane reformer permits higher hydrocarbon conversions and hydrogen yields over that anticipated by thermodynamic equilibrium and over that anticipated by a process that involves hydrogen production and hydrogen separation in a sequential fashion.

In some exemplary implementation the membrane module has high temperature operation of up to about 700° C. in hydrogen producing environment and pressure operation of up to about 200 psig at temperature, no adhesives are utilized as the metal membrane is directly bonded through laser welding thus providing a highly reliable assembly that can withstand operation at reforming conditions over multiple thermal cycles, straightforward scalablity to increase hydrogen production, and few components with simple geometries allowing for low cost manufacture with conventional processes and materials. Multiples of these modules can be used in the form of an array configuration.

According to a second aspect, a method for producing high purity hydrogen using an array of modules housed in a membrane reformer is disclosed. An array of modules has a benefit over a stack of modules as disclosed in the prior art, in that it allows for easy harvesting of hydrogen without the use of complicated flow routing, gasketing and manifolding. In some aspects it also permits an optimum use of space in a membrane reformer, particularly a planar membrane reformer, and straightforward scalability.

Other features and advantages of the present disclosure will be set forth in the following description and accompanying drawings, where the preferred embodiments of the present disclosure are described and shown. Additional details will become apparent to those skilled in the art upon examination of the detailed description taken in conjunction with the accompanying drawings or may be learned by practicing the present invention. The advantages of the present disclosure may be realized and attained by means of the instrumentalities and combinations particularly pointed out in the appendent claims.

BRIEF DESCRIPTION OF THE DRAWINGS

FIG. 1 illustrates an exemplary reactor sub assembly.

FIG. 2 illustrates an exemplary double-sided reactor sub assembly.

FIG. 3A illustrates an exploded perspective view of an exemplary membrane assembly.

FIG. 3B illustrates a compact perspective view of the membrane assembly of FIG. 3A.

FIG. 18 illustrates a cross sectional view of the membrane reactor shown in FIG. 17.

FIG. 20A illustrates an exploded perspective view of an exemplary membrane assembly including an integrated gasket.

FIG. 20B illustrates a compact perspective view of the membrane assembly of FIG. 20A.

FIG. 21 illustrates a cross sectional view of the membrane assembly shown in FIGS. 20A and 20B.

FIG. 24 shows a schematic representation of the membrane reactor of FIG. 8 in an ammonia based hydrogen generator.

FIG. 25 shows a schematic representation of the membrane reactor of FIG. 8 in an hydrocarbon based hydrogen generator.

FIG. 26 shows a diagram reporting measurements of the hydrogen flux (sccm/cm$^2$) through the reactor sub assembly of FIG. 1 described in Example 1. On the y-axis the hydrogen flux is reported. On the x-axis the time of measurements is reported.

FIGS. 45-48 show cross sectional diagrams of exemplary implementations of membrane module array and membrane reformer configurations.

Figure 4:
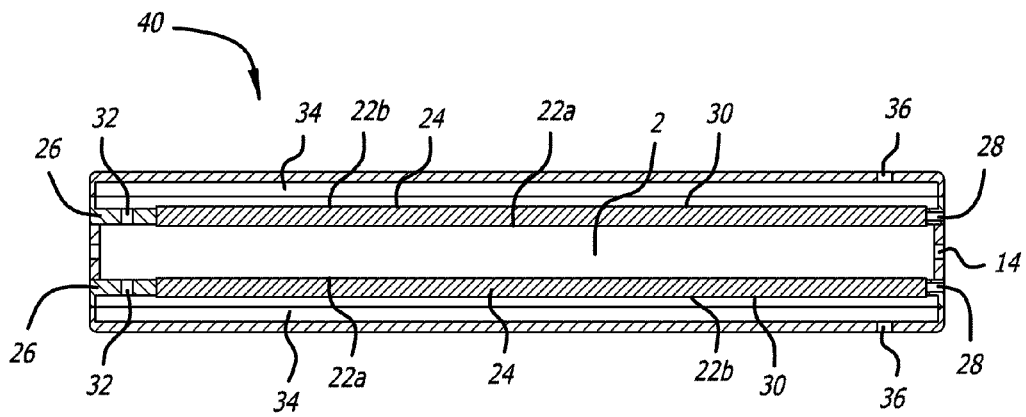
FIG. 4 illustrates an exemplary reactor subassembly containing two membrane assemblies as shown in FIGS. 3A and 3B.

It should be appreciated that for simplicity and clarity of illustration, elements shown in the Figures may not necessarily been drawn to scale. For example, the dimensions of some of the elements are exaggerated relative to each other for clarity.

DETAILED DESCRIPTION OF THE DISCLOSURE

FIG. 1 shows a sectional view of one embodiment of a membrane reactor sub assembly (10). The membrane reactor subassembly (10) includes a reaction chamber (2), a hydrogen exhaust chamber or plenum (4) and a membrane assembly (3) placed between the chamber (2) and the plenum (4).

The reaction chamber (2) contains a catalyst and comprises a reactor entry port (14) and reject port (16). The plenum (4) includes an exit port (18).

The membrane assembly (3) comprises an hydrogen separation membrane in the form of a membrane foil (8) and a membrane support sub-assembly including a membrane support (6) having perforations (7) and a metal retaining frame (12). In the membrane assembly (3), the membrane foil (8) is supported by the membrane support (6) and is held in place on the membrane support plate (6) using a metal retaining frame (12).

The hydrogen separation membrane in the form of a foil (8) is disposed off directly over the catalyst containing reaction chamber (2).

The feed enters the reaction chamber (2) through the reactor entry port (14). Hydrogen is generated in the reaction chamber, permeates through the membrane foil (8), flows through the perforations (7) in the membrane support plate (6) and into the plenum (4), and exits the reaction chamber through the hydrogen exit port (18). The reaction chamber tail gases that constitute the gas mixture rejected by the membrane, exit through the reject port (16).

The membrane foil (8) is preferably composed of palladium or alloys of palladium, and more preferably alloys of palladium and silver containing 70 to 80 at.-% palladium. The thickness of the membrane foil (8) is preferably in the 10 to 30 micron range although foils of other thicknesses may also be used.

The membrane support sub-assembly comprising the membrane support (6) and the metal retaining frame (12), may also comprise of a sintered porous metal substrate or a combination of a sintered porous metal substrate and a solid metal plate containing perforations or a combination of sintered porous metal substrate housed in a metal frame. The substrate can be formed of metal foam, metal monolith, metal mesh, ceramic foam, and ceramic monolith. Preferably, metals such as austenitic stainless steels (e.g., grades 303, 304, and 316) or high temperature nickel based alloys (e.g., Inconel® 600 series) are used to fabricate the metal components incorporated in FIG. 1. The components can have a wall thickness of about 2.5 mm. The use of such metals permits operation at high temperatures (450° C. to 700° C.) which is desirable for producing hydrogen. Preferably the sintered porous metal substrates such as those supplied by Mott Corp. (Farmington, Conn.) or Pall Corporation (East Hills, N.Y.) are used to support the thin foil membranes as these are typically less than 20% of the cost of machining perforations into solid metal plate stock and provide improved hydrogen transport compared to perforated plates. The sintered porous metal can have a thickness in the ranges of 1.0 mm to 6.5 mm, and more preferably 1.0 mm to 1.5 mm.

The perforated metal plates can have perforations of different sizes and the sizes of the perforations provide adequate support to the membrane and adequate porous volume for transporting the hydrogen to the hydrogen exhaust chamber. The porosity can range from 5% to 58% preferably from 20% to 50%. The perforations are spaced apart preferably of about 2.5 mm. The perforated metal plate can have 15% to 50% open volume and the sintered porous metal can be sealed to the perforated metal plate.

The membrane foil (8) may be joined and sealed in between frame (12) and support (6) using methods such as brazing, welding (TIG, MIG, electron beam, laser), or diffusion bonding. More preferably, the foil membrane is joined by brazing as practiced by Omley Industries (Grants Pass, Oreg.) and American Brazing (Willoughby, Ohio). A preferred alloy for the brazing process is 82% gold/18% nickel such as the Nioro® alloy supplied by Wesgo, Inc. (Belmont, Calif.) which is typically used in high performance aerospace applications. The form of the braze is preferably an extrudable paste but may also be in foil, flexibraze, wire, or powder form. Brazing is preferably done in a vacuum furnace with a peak temperature of 960° C. with a ramp rate of 200° C. per hour. During the braze process, a dead weight is applied to the retaining frame to maintain contact between the foil and the support and to provide a leak tight seal around the perimeter of the foil. The seal between the foil and the support may also be achieved without the use of a metal frame.

For example, a graphite fixture or other material resistant to brazing may be used to apply pressure during the braze process and then be removed. In the subsequent figures, the frame may not be shown in the membrane assembly, but it should be understood that the metal frame that may or may not be used during brazing, and if used exists only in a vestigial manner in the membrane assembly. That is, the frame does not serve any purpose once the membrane assembly is sealed to a reaction chamber to form the reactor sub assembly. A concern during brazing when using a perforated plate or a porous metal as a support, is wicking of the braze alloy into the pores and blocking of the permeation path and depletion of the braze material. A preferred method for eliminating this problem is to apply a stop-off material such as Nicrobraz® Green stop-off produced by Wall Colmonoy Corp. (Madison Hts., MI) between the braze area and the perforated or porous support. Another method to prevent braze flow to porous components is to machine a channel between the braze area and the perforated or porous support to provide a reservoir for excess braze to run off without flowing into the perforated or porous support itself.

Even though the hydrogen separation membrane is described above as a thin membrane foil (8), the methods need not be necessarily restricted to foils. For example, the hydrogen separation membrane can be applied to the faces of the porous substrates using deposition techniques. In these methods, precursors of the palladium or palladium membrane are applied to the faces of the substrates and are then decomposed to their metallic components to yield a defect free membrane film. These thin film containing substrates can then be integrated into the device using suitable joining techniques such as brazing, welding, and diffusion bonding. A porous ceramic mat can be disposed between the substrate in the reaction chamber and the membrane surface. A retaining frame can also be comprised to hold the mat in contact with the substrate to eliminate contact between the membrane surface and the substrate.

The reaction chamber (2) contains a suitable catalyst material to generate hydrogen from hydrocarbons or non-hydrocarbons such as ammonia or oxygenates such as alcohol. In the case of hydrocarbons, steam reforming is the preferred route with typical operating conditions between 575 and 650° C. and between 5 and 10 bar. The catalyst can be in the powder form (45 to 140 mesh) and loaded into mesochannels that may be machined into the reactor body. The flow dimensions of the mesochannels are typically between 0.5 and 2 mm. More preferably the catalyst material is coated onto substrates such as metal foams of alloys such as Fecralloy® or Inconel® as supplied by Porvair (Hendersonville, N.C.) with the dimensions of the irregular flow channels in the foams still being in the mesoscale range of 0.5 to 2 mm range. The catalyst coated substrate is then inserted into the reactor body. Preferably a porous pliable material lies between the catalyst and the membrane foil surface to prevent any damage (scratches, holes etc) to the thin membrane foil. A preferred candidate for a pliable material is the Interam™ 1101 HT ceramic mat as supplied by 3M Corporation (Minneapolis, Minn.). Example 1, later described, demonstrates pure hydrogen production using a reactor sub assembly as shown in FIG. 1 that contains a porous metal support in place of the perforated plate to support the membrane foil. Example 2, later described, demonstrates pure hydrogen production using a reactor sub assembly as shown in FIG. 1 that contains a perforated plate as a support for the foil. The results shown in Examples 1 and 2 teach that the sintered porous metal substrate is a preferred support for supporting the hydrogen separation membrane foil. The location of the entry and exit ports in FIG. 1 is shown in example only. The catalyst, palladium and/or any other components in the reactor assembly can be deposited onto the surface using techniques such as cold-spray technique described in PCT/US04/37620 herein incorporated by reference.

FIG. 2 shows a sectional view of reactor sub assembly (20) which is a double sided variant of reactor subassembly (10).

In reactor sub assembly (20), a membrane assembly consisting of the membrane support sub assembly and the foil (8) is located on both sides of the reaction chamber (2) containing the catalyst. Hydrogen generated in the reaction chamber permeates through the membrane foils (8) and supports (6), flows through the perforations in the support (7), and is collected in the hydrogen plenum (4) on either side of the reaction chamber (2).

Since the hydrogen permeation rate through the membrane increases with available membrane surface area for a given set of operating conditions, this embodiment effectively increases the available surface area for hydrogen permeation by 100% while increasing the unit mass by only 30% when compared to the reactor sub assembly in FIG. 1. Accordingly, this embodiment allows to increase the hydrogen production rate without increasing the footprint of the basic unit. The location of the entry and exit ports in FIG. 2 is in example only and other variations are possible.

FIGS. 3A (exploded perspective view) and 3B (compact perspective view) illustrate an exemplary double sided hydrogen separation membrane assembly (30).

In the membrane assembly (30), a membrane support sub assembly including a sintered support (24) and a housing (26) is integrated with more than one membrane (22). The housing (26) includes an hydrogen exit port (28). In the membrane assembly (30), the sintered porous support (24) is nested inside a housing (26) and sandwiched between a membrane (22) on either side.

When a hydrogen containing gas is exposed to the membrane surfaces under appropriate operating conditions, hydrogen permeates through the membrane surfaces, flows through the porous support and out of the housing through the hydrogen exit port (28). The support (24) acts not only as a support for the membranes but also serves the purpose of flow channel for transporting hydrogen from the surface of the membranes to the exit port (28).

A distinct advantage of this membrane assembly embodiment lies in the fact that both sides of the component are at the same pressure, and thus the strength of the support is limited only by the compressive yield strength of the support which is much higher than the tensile strength of metals and ceramics. A membrane assembly arranged in this manner is highly suitable for high pressure applications as the stress on the support of the membrane is equalized by the pressure on both sides.

The support (24) is preferably intrinsically porous in nature such as porous sintered metals or porous metal foams. Porous metal substrates are preferred to ceramic substrates because components can be readily joined using conventional techniques such as brazing, welding etc. The housing, frame and the foil that constitute the membrane assembly may be joined in a leak tight fashion using techniques such as brazing, welding, diffusion bonding, or other applicable joining techniques.

FIG. 4 shows a reactor sub assembly (40) constituting an exemplary variant of reactor sub assembly (20) shown in FIG. 2, which incorporates the double sided membrane assembly (30) shown in the sectional views of FIGS. 3A and 3B.

In the reactor sub assembly (40), a double sided membrane assembly (30) is placed on both sides of the reaction chamber (2) separating the reaction chamber (2) from two plenums (34) which include a tail gas plenum. Accordingly, each of the membrane assemblies (30), comprises a first membrane (22a) facing the reaction chamber and a second membrane (22b) facing the plenum (34).

The hydrogen containing feed or fuel that needs to be reformed enters the reaction chamber (2) through the entry port (14). Tail gases, including hydrogen and possibly other components such as CO, $CH_4$, $CO_2$, are generated in the reaction chamber (2) and permeates the membrane subassembly (30) through the membranes (22a). Instead of exiting the reaction chamber at the end opposite to that of the entry port (14), the tail gases are routed through the internal reject port (32) and come in contact with by the second set of membrane surfaces (22b). The hydrogen that continues to be collected by permeating through the membranes, flows into the porous support (24) and exits through the hydrogen exit port (28). The tail gases rejected by the membranes (22a) and (22b), exit through the reject exit ports (36) located in each membrane assembly.

The reactor sub assembly (40) provides an additional increase in pure hydrogen production rates with minimal increase in reactor footprint when compared to reactor sub assembly (20) shown in FIG. 2.

To prevent any flow restrictions or impediments through the membranes due to the support material, the porosity of the sintered porous substrate should preferably be between 20% and 50%. In addition, the thickness of the support may be increased to allow a larger flow region that separates the membranes. Each of the two membrane assemblies (30) in the reactor sub assembly (40) shown in FIG. 4, incorporates four membrane foil surfaces, thus increasing the exposed membrane area by 400% when compared to the reactor sub assembly shown in FIG. 1, while increasing the weight by only 40%.

The reactor sub assemblies shown in FIGS. 1, 2 and 4 can also be used as standalone hydrogen purifiers as demonstrated by later described Example 1. The purifiers can be utilized to produce pure hydrogen from an impure hydrogen feed (example 99% or less) for applications such as the semiconductor industry. In such applications, the catalyst can be replaced by a porous media that does not contain catalyst coating.

Figure 5:
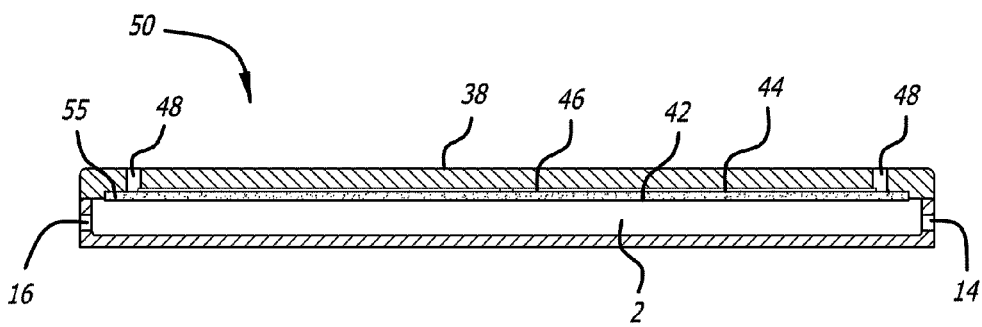
FIG. 5 illustrates an exemplary plenum-less variant of the reactor subassembly of FIG. 1.

FIG. 5 shows a reactor sub assembly (50) which constitutes an exemplary plenum-les variant of the reactor sub assembly (10) shown in FIG. 1. The membrane assembly (55) here consists of a membrane foil (44) supported on a sintered porous metal support (42) that is inserted into a plate (38). The sintered porous metal support (42) serves the dual purpose of providing support for the membrane and of behaving as channel for transporting hydrogen from the membrane surface to the exit port (48). Additional collection channels (46) may be included in the plate (38). The resulting reactor sub assembly is therefore very compact.

Figure 6:
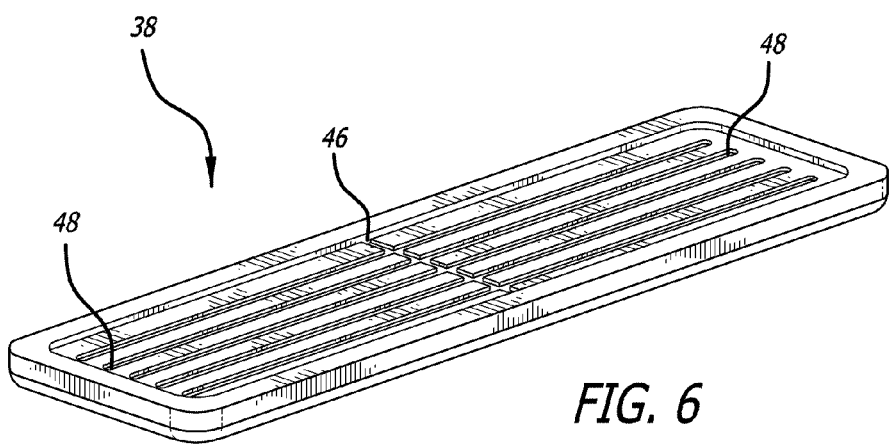
FIG. 6 illustrates an exemplary support element of the reactor sub-assembly of FIG. 5.

FIG. 6 shows an exemplary variant of plate (38) that contains a recess to receive the porous metal substrate (44), and hydrogen collection channels (46) machined on to the surface of the plate facing the porous metal substrate. The pattern of these channels is shown in example only.

In the reactor sub assembly (50) shown in FIG. 5, hydrogen containing feed or the fuel that needs to be reformed enters the reaction chamber (2) through the entry port (14). Hydrogen is generated in the reactor chamber, permeates through the membrane foil (44), flows through the porous metal insert (42) and is routed through channels (46) machined into the plate (38). Pure hydrogen exits the reactor sub assembly through one or both of the exit ports (48). The tail gases rejected by the membrane exit the reaction chamber through the port (16).

Plenumless variants analogous to the reactor sub-assembly (50) can be derived from of other reactor sub-assemblies, such as reactor assembly (20), (30) and (40) by a person skilled in the art based on the content of the present disclosure and will not herein described in further details.

Figure 7:
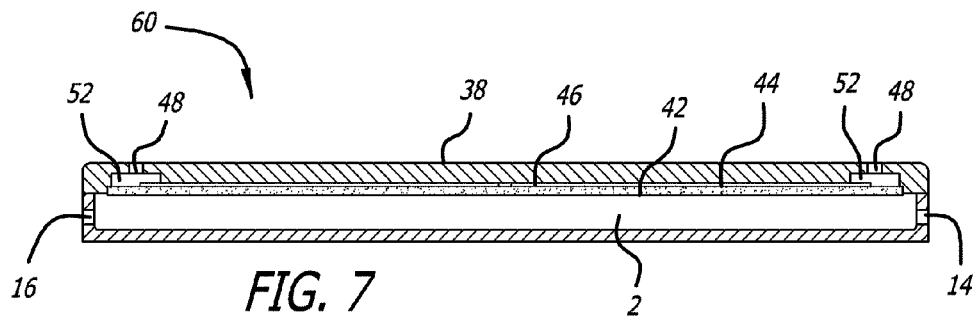
FIG. 7 illustrates an exemplary variant of the plenum-less reactor sub assembly of FIG. 5.

FIG. 7 shows a reactor sub assembly (60) which constitutes a variant of the plenum-less reactor sub assembly (50) shown FIG. 5. In the reactor sub assembly (60) a header (52) is located at the hydrogen exit ports (48) of the reactor sub assembly. This header facilitates hydrogen removal by creating a larger volume for hydrogen collection in close proximity to the exit ports. In some embodiment the header also allows removal of flow impediments.

As known to those skilled in the art, hydrogen separation through palladium based membranes is effected at temperatures greater than 350° C. Hydrogen generation via steam reforming or otherwise requires temperatures in excess of 350° C., preferably around 550 to 650° C. Therefore, heat needs to be provided to the reactor sub assemblies described above. Heat may be provided externally using either a resistance wire or other electrical means (such as in Examples 1 and 2). An alternate preferred embodiment would be to integrate a combustion chamber with the reactor sub assembly to form a membrane reactor. In the disclosure described here, a hydrogen generator is composed of a membrane reactor with associated fluid lines, such as a air supply, a reaction fuel supply and a combustion fuel supply, for transport of appropriate streams in and out of the membrane reactor.

Figure 8:
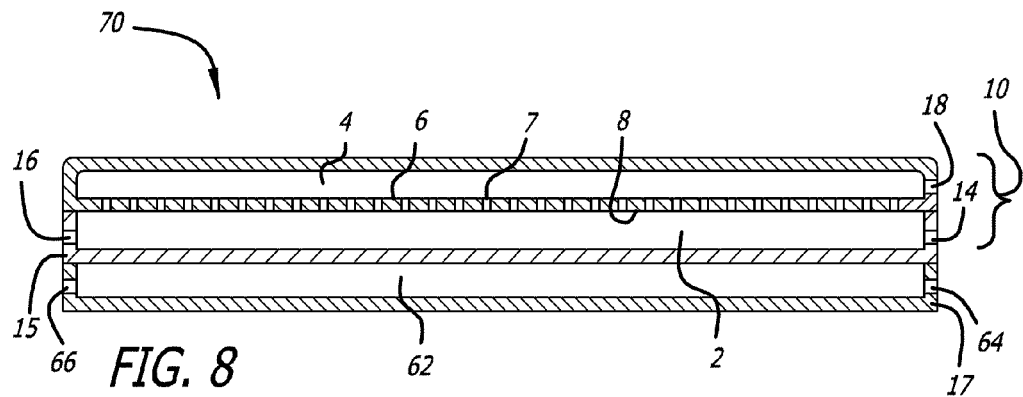
FIG. 8 illustrates an exemplary membrane reactor that integrates the reactor sub assembly of FIG. 1 with a combustion chamber.

FIG. 8 illustrates an exemplary membrane reactor (70) which includes a reactor sub assembly (10) shown in FIG. 1 integrated with a combustion chamber (62). The reaction chamber (2) in the reactor subassembly and the combustion chamber (62) are disposed on either side of a separation plate (15). An end plate (17) close the combustion chamber on the side opposing the separation plate (15). In the membrane reactor (70), the combustion chamber (62) provides heat to drive hydrogen generation and separation.

The combustion chamber (62) comprises a combustion chamber substrate and the reaction chamber (2) comprises a catalyst coated reaction chamber substrate, formed by the membrane (8). The approximate pore diameter or flow dimension of the substrates can be in the 0.2 to 3.0 mm range.

Combustion fuel and air enters the combustion chamber at the entry port (64) and is converted to $CO_2$ and $H_2O$ while generating heat. The fuel to the reaction chamber (examples, fuel and water in the case of steam reforming of hydrocarbons, ammonia in the case of ammonia cracking) enters the reaction chamber (2) through the entry port (14) and reaction tail gases exit through the port (16). The generated hydrogen permeates through the membrane (8) and through the membrane support sub assembly consisting of the porous support (7), the perforated plate (6) to support (7), and into the plenum (4), and exits the unit through the exit port (18). The tail gases from the combustion chamber or combustion by-product gases exit through the exit port (66).

Combustion is preferably confined to catalytic combustion, whereby, the heat is generated in a flameless fashion. This method is inherently safe and is suitable for a wide range of applications and particularly for fuel cell applications for portable services. The catalyst can be in the powder form (45 to 140 mesh) and may be loaded into mesochannels that may be machined into the reactor body. The flow dimensions of the mesochannels are typically between 0.5 and 2 mm. More preferably, the catalyst material is coated onto substrates such as metal foams of alloys such as Fecralloy®, Fe CrAlY, austenitic steel or Inconel® as supplied by Porvair (Hendersonville, N.C.) with the dimensions of the irregular flow channels in the foams still being in the 0.5 to 2 mm range. The catalyst containing substrate is then inserted into the reactor body. In contrast to the reaction chamber, a ceramic mat need not be placed between the catalyst the surface of the reaction chamber that is in contact with the combustion chamber.

Catalytic combustion is initiated at a temperature commonly denoted as the "light-off" temperature for a particular catalyst. For hydrocarbons, this light-off temperature is typically in the 150 to 350° C. range; for example the light-off temperature for propane over noble metal containing catalysts is around 175° C. The catalyst may be heated to this temperature using ancillary heating methods such as through a resistance wire that is powered by a battery or other electrical source. Alternately, since hydrogen can light-off at room temperature over certain noble metal containing catalysts, hydrogen stored in a small hydride canister, in a compressed cylinder, or in a liquefied state can be used to increase the temperature of the catalyst from room temperature to light-off temperature during start-up.

The fuel for combustion can constitute a fraction of the same fuel that is used as the feed for hydrogen generation. Alternatively, an external fuel or an ancillary fuel may also be supplied. Also, a fuel supply providing fuel to both the reaction chamber and the combustion chamber can be provided. Alternatively, a reaction fuel supply can be provided separate from a combustion fuel supply. More preferably, the reaction chamber tail gases that contain $H_2$ and combustibles such as CO and hydrocarbons rejected by the membrane that exits through the port (16) in FIG. 8 can be routed into the combustion chamber through the port (64). The reaction chamber tail gases can thus be utilized either as the sole source of heat for the endothermic hydrogen generation reaction or as a supplement to the existing secondary fuel source to improve system efficiency.

Figure 9:
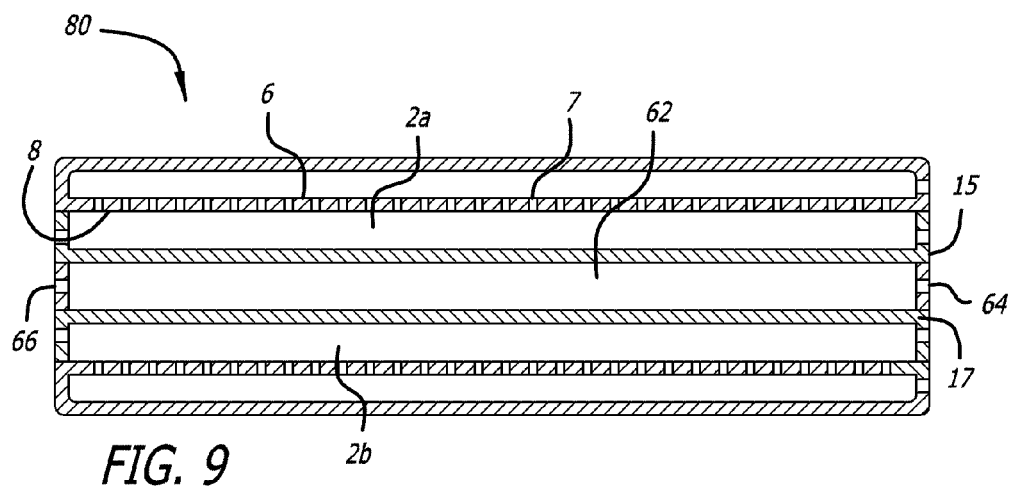
FIG. 9 illustrates an exemplary membrane reactor that integrates the reactor sub assembly of FIG. 2 with a combustion chamber.

FIG. 9 illustrates an exemplary membrane reactor (80) which includes the reactor sub assembly (20) shown in FIG. 2 integrated with a combustion chamber (62). In the membrane reactor (80) the combustion chamber (62) is located between the two reaction chambers (2a) and (2b) in a configuration wherein more than one membrane surface is provided for hydrogen separation.

In particular, in this embodiment, a combustion chamber (62) is sandwiched between two reaction chambers (2) in a compact manner that generates heat to drive both hydrogen generation and separation with 100% more membrane surface area than the membrane reactor (70) shown in FIG. 8. The combustion fuel and air enter through the entry port (64). The tail gases from the combustion chamber exit through an exit port (66).

Figure 10:
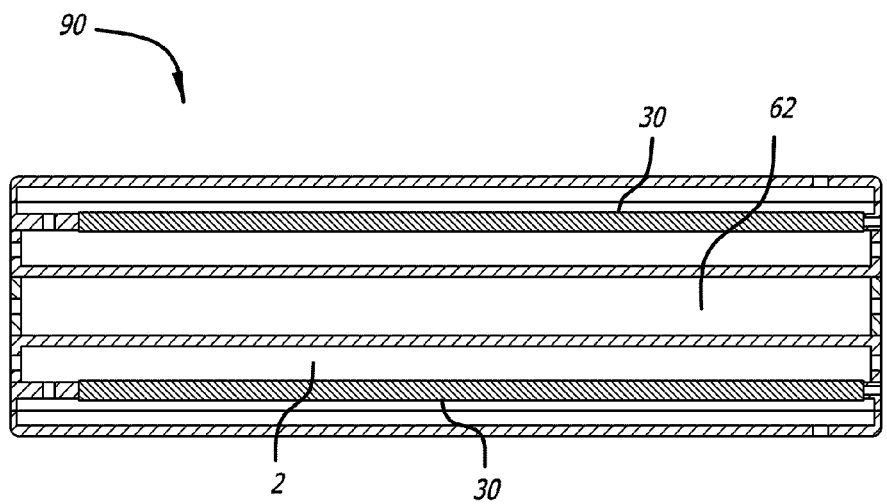
FIG. 10 illustrates an exemplary variant of the membrane reactor of FIG. 9 which includes the membrane assembly shown in FIGS. 3A and 3B.

FIG. 10 illustrates a membrane reactor (90) which is an exemplary variant of a membrane reactor (80) shown in FIG. 9, wherein the membrane assemblies constituted by the membrane foil (8) and the support plate (6), are replaced by the membrane assemblies (30) as described in FIGS. 3A and 3B. An effect is that the membrane surface area of the membrane reactor (90) is increased with respect to the one of the membrane reactor (80). In effect, the membrane surface area available for hydrogen separation is twice that of the surface area of the membrane reactor (80) shown in FIG. 9, while insuring only a negligible increase in reactor footprint.

Figure 11:
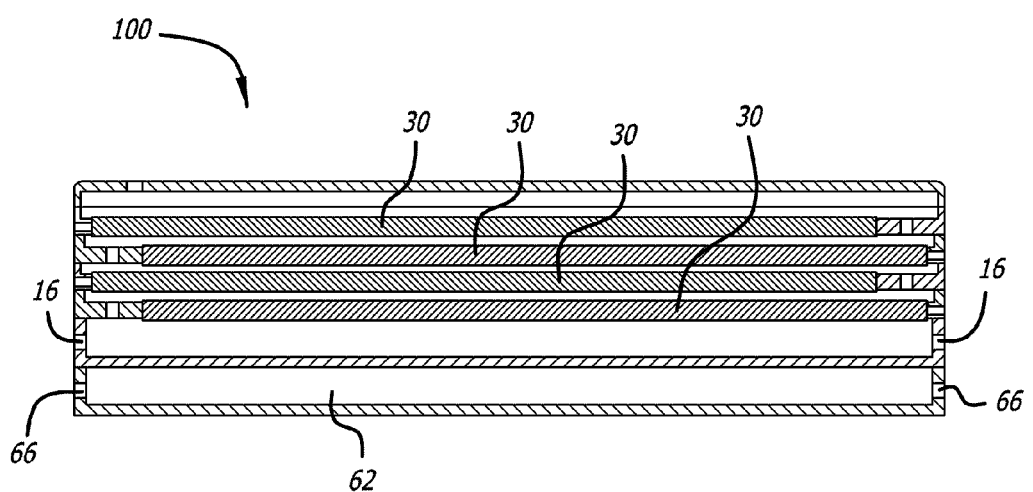
FIG. 11 illustrates an exemplary variant of the membrane reactor of FIG. 8 which includes several membrane assemblies as shown in FIGS. 3A and 3B.

FIG. 11 illustrates a membrane reactor (100) which constitutes a variant of the membrane reactor (70) shown in FIG. 8. In the membrane reactor (100) the membrane assembly, constituted by the membrane foil (8) and the support plate (6), is replaced by several membrane assemblies (30) as shown in FIGS. 3A and 3B, that are arranged in a stacked fashion. In this manner, the membrane surface area of the membrane reactor (100) can be increased with respect to the one of membrane reactor (70) to elegantly provide increased hydrogen generation and production rates without increasing the dimensions of the reactor. The number of membrane assemblies can be chosen to satisfy the targeted pure hydrogen production rates. The feed and product flow paths should be suitably manifolded to introduce feed streams and remove product streams from the membrane reactor.

Figure 12:
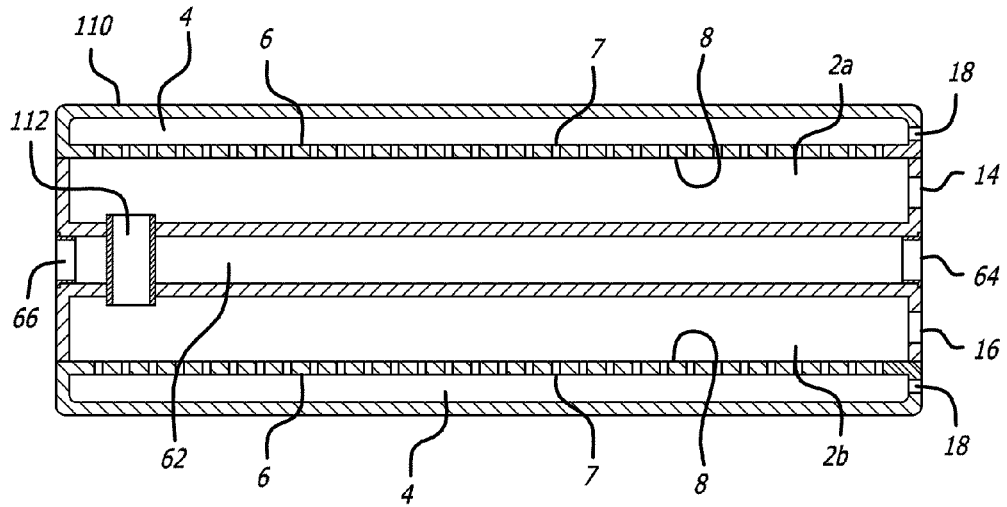
FIG. 12 illustrates an exemplary "folded" variant of the membrane reactor of FIG. 9, which includes an internal connector between the two chambers.

FIG. 12 shows a membrane reactor (110) which constitutes an exemplary preferred variant of membrane reactor (80) shown in FIG. 9 including an internal connector (112) located within the reactor between the two reaction chambers (2a) and (2b).

In the membrane reactor (80), the two reaction chambers (2a) and (2b) are located on the sides of the combustion chamber (62) and have separate entry ports (14) and exit ports (16). Therefore, in the membrane reactor (80) the reaction chambers (2a) and (2b) are not in fluid communication with each other.

In the membrane reactor (110) the internal connector (112) connects the reaction chamber (2a) and (2b) through the combustion chamber (62) and facilitates fluid communication between the two reaction chambers.

In the membrane reactor (110), the internal connector (112) obviates the need for splitting flows in equal portions that would otherwise be required while feeding into the reaction chambers of a membrane reactor such as membrane reactor (80) as shown in FIG. 9. In addition, the internal connector (112) also obviates the need for manifolding the reaction chamber tail gas streams that exit the reaction chambers.

In the membrane reactor (110), the reaction chambers (2a) and (2b) are in essence "folded" around the combustion chamber to make use of both hot surfaces of the combustion unit (62) which reduces the exposed hot surfaces thereby minimizing thermal losses to ambient. The fuel for combustion may consist of any combustible fuel such as a hydrocarbon (e.g., propane, methane, butane, gasoline, JP-8, diesel fuel, kerosene, biodiesel, etc.) or ammonia and is may be same fuel as fed to the reaction chamber. The primary fuel for combustion can be composed of the tail gas stream from the reaction chambers (2a) and (2b) that is either externally or internally routed to the combustion chamber (62). The fuel and air for combustion enters the combustion chamber through the port (64) and exits at the opposite end of the combustion chamber at the combustion chamber through exit port (66).

The fuel feed from which hydrogen is to be produced is routed into the reaction chamber through the entry port (14). It is preferably preheated externally through a separate heating unit or by a heat exchanger prior to be fed into the entry port (14). In the presence of a suitable catalyst in the reaction chamber, the feed is converted to a hydrogen containing stream. The hydrogen containing gases flow through the reaction chamber (2a), and then through the connector (112), and into to the secondary reaction chamber (2b), where the unreacted feed is further converted to hydrogen. This connector is part of an otherwise solid wall that acts as a common interface and separating divider between the reaction chambers and the combustion chamber. The connector (112) may be composed of a tube that is inserted into holes machined into the otherwise solid dividing walls and is sealed using techniques comprising of welding, or brazing. The connector may also be a channel that is machined or otherwise formed into the reaction chambers during the manufacturing/machining process as long as the reactant stream is allowed to internally bypass the combustion chamber without leakage. The reactor connector (112) could also be plumbed externally between the two reaction chambers (2a) and (2b). Hydrogen is separated through the membrane as the gases flow through the reaction chambers and the reaction chamber tail gases exit the chamber through reject port (16).

In the membrane reactor (110), the sides of the reactor chambers (2a) and (2b) that are opposite to the dividing wall between the reactor chambers and the combustion chamber (62), contain the membrane assemblies consisting of the membrane (8) supported on the membrane support sub assemblies. The membrane which may be in the foil form is supported by the membrane support sub assembly which consists of a support plate (6) containing perforations (7), or more preferably consists of a porous metal plate that is further secured into a perforated metal support to provide additional structural rigidity.

The membrane may also consist of a composite membrane deposited on a porous metal, ceramic, or composite metal/ceramic support through means of electroless plating, electroplating, sputtering, spin coating, chemical vapor deposition, or other techniques or combinations of these techniques.

This composite membrane would likewise be further supported by a perforated or otherwise macro-permeable support structure. In this case, the membrane would preferably be isolated from the support metal by a diffusion barrier consisting of an oxidized layer, a ceramic or refractory metal layer, or barrier composed of other suitable material to prevent unwanted diffusion from the support into the membrane.

The membrane in the membrane assembly spans the entire length of the reactor chambers and would actively remove hydrogen produced in the reactor chambers. The hydrogen which permeates through the membrane is collected in the hydrogen plenum (4) and exits through the unit at the two ports (18) and may then be used to generate electricity using a PEM fuel cell for example, be routed to a storage container, or be otherwise utilized.

Figure 13:
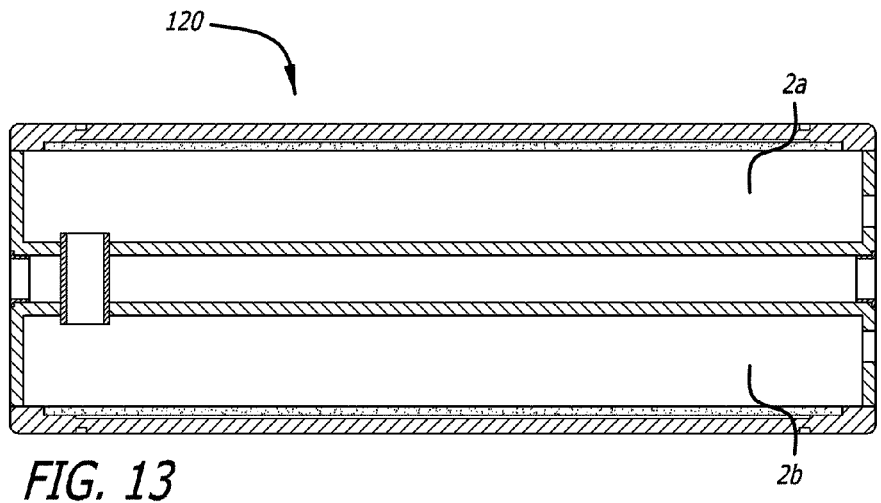
FIG. 13 illustrates an exemplary plenum-less variant of the membrane reactor of FIG. 12 which includes two reaction subassemblies as shown in FIG. 5.

FIG. 13 shows a membrane reactor (120) which is an exemplary plenum-less variant of the membrane reactor (110) which includes the membrane assembly is as described in FIG. 5. The membrane reactor is otherwise similar to the membrane reactor (110) as described in FIG. 12. The two reaction chambers (2a) and (2b) of the membrane reactor (120) are in internal fluid communication with each other. Example 4, later described, shows an example of pure hydrogen production process with rates from a feed 75% $H_2$/25% $N_2$ using a hydrogen generator containing a membrane reactor (120) as shown in FIG. 13. Example 5, later described, describes pure hydrogen production rates from ammonia cracking using a hydrogen generator containing a membrane reactor (120) as shown in FIG. 13.

The membrane reactor (120) shown in FIG. 13 contains a pure hydrogen collection plenum on the downstream side (low pressure side) of each membrane surface. As described in FIG. 5, the reactor sub assembly need not contain a hydrogen plenum wherein the membrane is supported on a porous metal substrate which is directly supported by a metal support plate, and whereby the porous metal substrate also provides a connector for transporting pure hydrogen from the membrane surface to the exit port of the reaction chamber.

Figure 14:
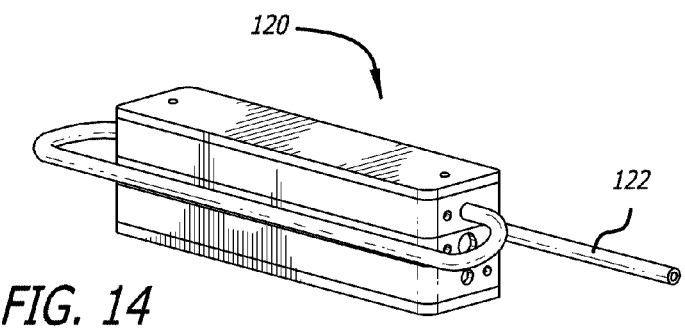
FIG. 14 illustrates the plenum-less "folded" membrane reactor of FIG. 13 with an integrated feed gas pre-heater.

FIG. 14 illustrates an exemplary variant of the membrane reactor (120) including a feed pre-heater. In the variant of the membrane reactor (120) shown in FIG. 14, a winding piece metal tubing (122) is wrapped around the external surface of the combustion chamber to serve as a feed pre-heater or steam generator. The tubing may be tack welded to insure good heat transfer. The feed (ammonia in the case of Example 5) flows through this tubing prior to feeding into the reaction chamber and gets heated from ambient temperature to close to reaction temperature. This practice insures maximum utilization of the catalyst volume for hydrogen production, since preheating is accomplished external to the reaction chamber.

In the examples described above, the membrane foil or a porous substrate containing a deposited membrane is sealed by "gasketless" joining techniques such as brazing. In some services, it may be beneficial to seal the membranes using gaskets that allow for the non-destructive opening of the reaction chamber for inspection, catalyst replacement, and membrane replacement or for other purposes. The gasket material may be made of any material that is capable of withstanding up to 600° C. in slightly oxidizing conditions. Candidate materials are graphite such as produced by Garlock (Palmyra, N.Y.), vermiculite such as produced by The Flexitallic Group, Inc. (Houston, Tex.), or ceramic such as produced by Cotronics, Corp., (Brooklyn, N.Y.). In general, gasketed devices are heavier than gasketless devices due to the need for a flanged configuration to house and compress the gaskets.

Figure 15A:
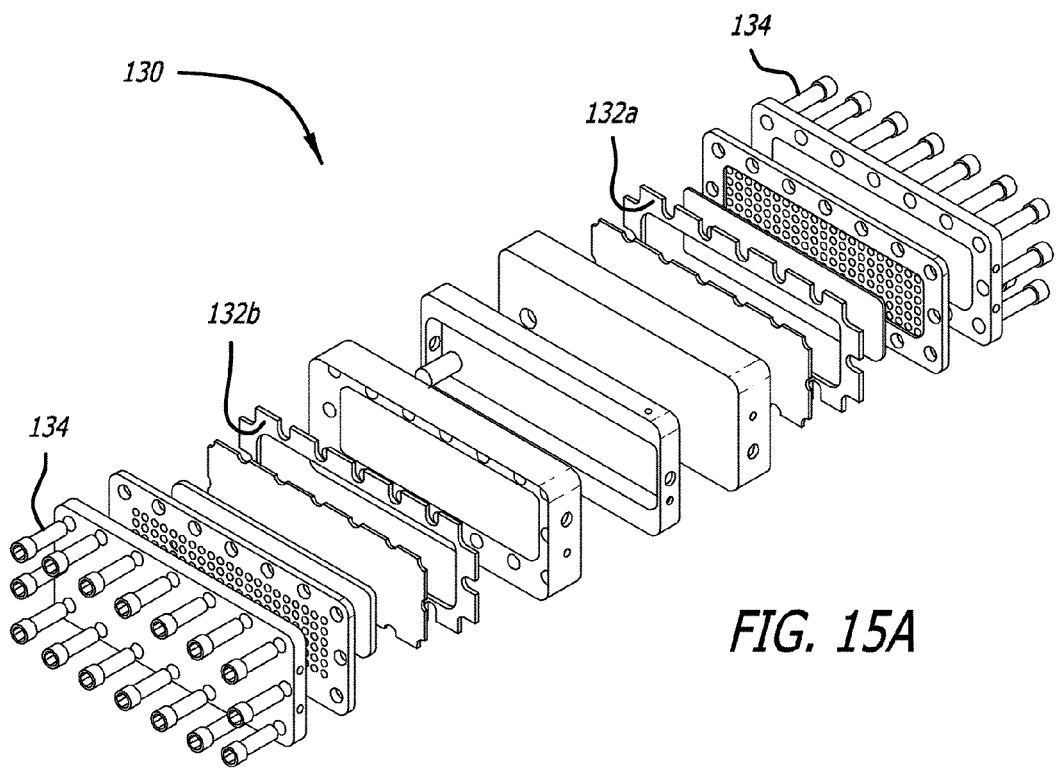
FIG. 15A illustrates the exploded view of an exemplary gasketed variant of the "folded" membrane reactor of FIG. 13.
Figure 15B:
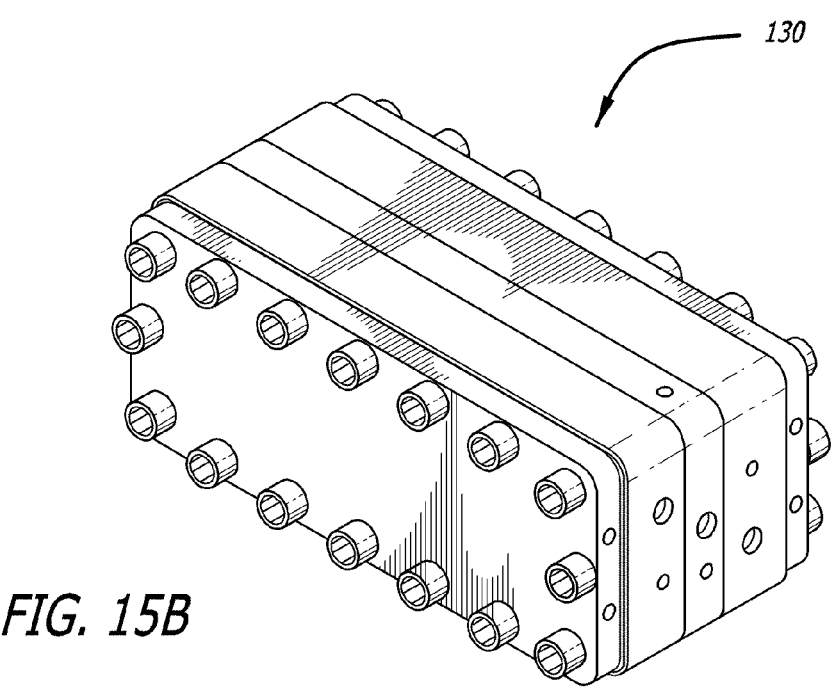
FIG. 15B illustrates the compact view of the exemplary "folded" gasketed membrane reactor of FIG. 15A.
Figure 16:
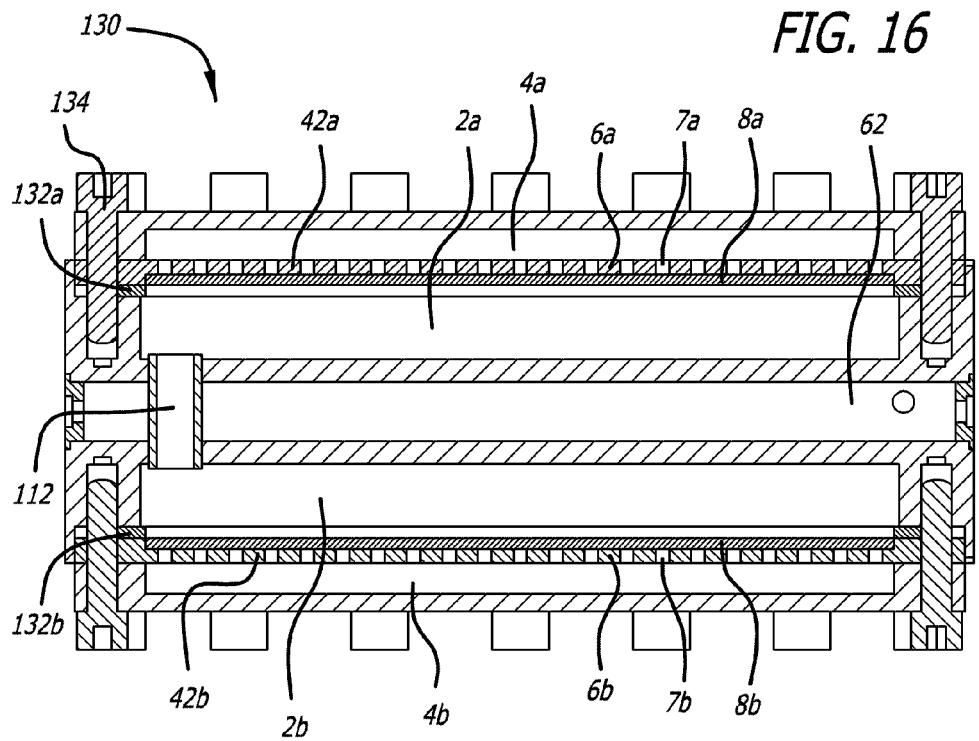
FIG. 16 illustrates a cross-section of the gasketed membrane reactor of FIGS. 15A and 15B.

FIG. 15A (exploded perspective view) FIG. 15b (compact perspective view) and FIG. 16 (compact sectional view) illustrate a membrane reactor (130), incorporating two reaction sub assemblies and one combustion chamber with the reaction chambers in fluid communication with each other, in which the membrane foil is sealed using gaskets.

The underlying configuration of the membrane reactor is the "folded" membrane reactor configuration described in FIG. 13 incorporating two reaction chambers and one combustion chamber, with the reaction chambers being in fluid communication with each other through a connector (112). Each of the gaskets (132a) and (132b) is placed between one of the membrane foils (8a) and (8b) and the respective reaction chambers (2a) and (2b). Each of the sintered porous supports (42a) (42b) is disposed off between one of the foil and one of the respective perforated plates (6a) and (6b), the latter to provide structural support to the sintered porous support. Hydrogen produced in the reaction chambers (2a) and (2b) flows through the porous metal supports (42a) and (42b) and through the perforations (7a) and (7b) in the perforated support plates (6a) and (6b), and into the hydrogen plenums (4a) and (4b). The assembly is held together using bolts (134) that pass through the plenum housings (4a) and (4b), perforated support plates (6a) (6b), gaskets (132a) and (132b), and are secured into the reactor housings (2a) and (2b). Gaskets (132a) and (132b) can also be compressed to form a leak tight seal between the membrane foils (8a) and (8b) and the hydrogen plenum (4a) and (4b) on one side, and between the membrane foils (8a) and (8b) and the hydrogen reactor chamber on the other side. The combustion chamber (62) provides heat for the endothermic hydrogen generation reaction. The two reaction chambers (2a) and (2b) are joined to the combustor (62) using joining methods such as brazing or welding. Although the fluid entry and exit ports are not shown in FIG. 16, they can be suitably located as described elsewhere in this disclosure.

Gaskets (132a) and (132b) can be made of a material chosen from a group consisting of Grafoil, metal reinforced Grafoil, ceramic, and vermiculite. Gaskets (132a) and (132b) can also have a thickness in a range of 1.5 mm to 6.5 mm.

Example 6, later described, illustrates pure hydrogen production from ammonia using a hydrogen generator containing the membrane reactor described in FIGS. 15A, 15B and 16. As can be seen in Example 6, about 4 ppm of ammonia was detected as impurities in the pure hydrogen stream exiting the reactor. This ammonia impurity was easily removed by flowing the hydrogen stream through a bed of molecular sieve 4A adsorbents (25/35 mesh particles, Grade 514, Grace Davison).

Variants of reactor assemblies having components disposed in a different configuration than the one disclosed in FIGS. 15A, 15B and 16 and wherein the components are sealed through gaskets can also be provided according to the present disclosure. As an example, a hydrogen generator containing a gasketed membrane reactor having the underlying configuration of the membrane reactor (70) described in FIG. 8, can be provided according to the present disclosure.

Example 7, later described, illustrates pure hydrogen production from a synthetic kerosene fuel (ClearLite™, product of Exxon) by steam reforming using this gasketed variants of the membrane reactor (70), that is, one reactor sub assembly integrated with one combustion chamber.

In the description taught in Example 7, the hydrocarbon feed was first treated in a feed pre-treatment chamber that was located external to the membrane reactor unit to produce hydrogen containing gases. The catalyst coated substrate located in the feed pre-treatment chamber can be different from a catalyst located in the reactor chamber.

It would be advantageous to integrate a feed pre-treatment chamber with the membrane reactor to exploit the heat available from the combustion chamber. Furthermore, it would be advantageous to vaporize the water prior to feeding into the pre-treatment chamber.

Figure 17:
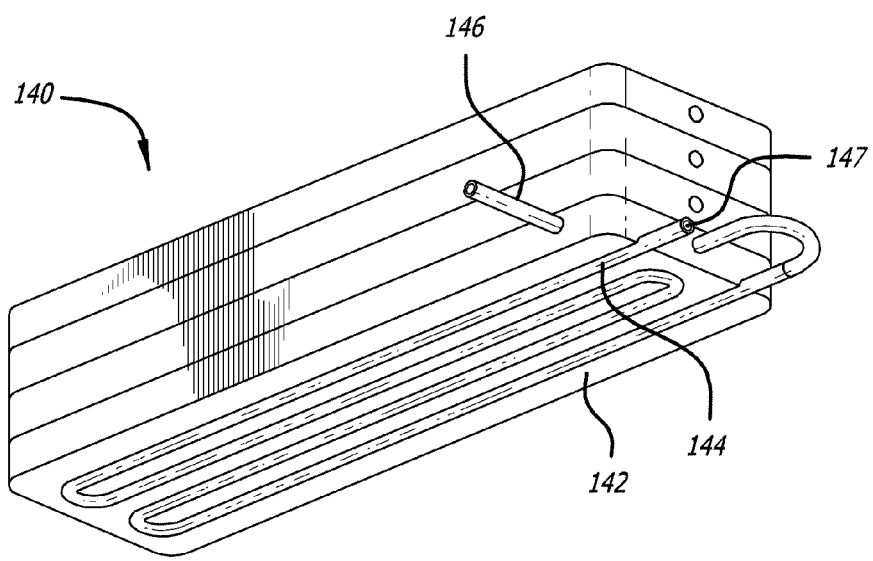
FIG. 17 illustrates an exemplary variant of the membrane reactor shown in FIG. 8 including an integrated water vaporizer and feed pre-treatment chamber.

FIGS. 17 and 18 describe membrane reactor (140) which constitutes an exemplary membrane reactor, including the reactor subassembly (70) described in FIG. 8 with a water vaporizer and a pre-treatment chamber.

The membrane reactor (140) is identical to that described in FIG. 8, but a pre-treatment chamber (142) is integrated with the combustion chamber to utilize heat generated from the combustion chamber (62) to drive the pre-treatment process. Water enters the membrane reactor at the vaporizer tubing (144) and passes through a coil that is in close contact with the external surface of the pre-treatment chamber (142). This coil is joined either through brazing or welding to provide the most intimate contact for best thermal conduction. The water passes through the coil and enters the pre-treatment chamber at entry port (147). Fuel enters the pre-treatment chamber through the fuel entry port (146). The fuel entry port is shown as being on the side of the vaporizer body but may be located in any manner which provides the injection of the fuel in close proximity to the entry point of the vaporized water. The pre-treated fuel now containing some hydrogen, flows through exit port (148), and into a pre-treatment chamber-reaction chamber connecting tubing (143). This tubing may be located either external to the reactor as shown or preferably internal to the reactor in a similar manner to the connector element (112) shown in FIGS. 12, 13, and 16. Example 9, later described, demonstrates pure hydrogen production from kerosene and Example 10, later described, demonstrates pure hydrogen from propane using a hydrogen generator containing the membrane reactor as described in FIG. 18. As described in Example 10, the membrane reactor as described in FIG. 18, permits uninterrupted pure hydrogen production even during the "hot-swap" of fuels which involves changing from one fuel to another while the membrane reactor is hot. Example 11, later described, demonstrates pure hydrogen production from alcohol-water mixtures using a hydrogen generator containing the membrane reactor as described in FIG. 18.

The integration of a vaporizer and pre-treatment chamber to a membrane reactor configuration as shown in FIG. 8 to yield a configuration as shown in FIG. 18 is only exemplary. The same procedure can be practiced in other membrane reactor configurations that may follow a stacked or modular pure hydrogen producing package. Also the presence of a pre-treatment chamber separated from a reaction chamber is not necessary.

Figure 19:
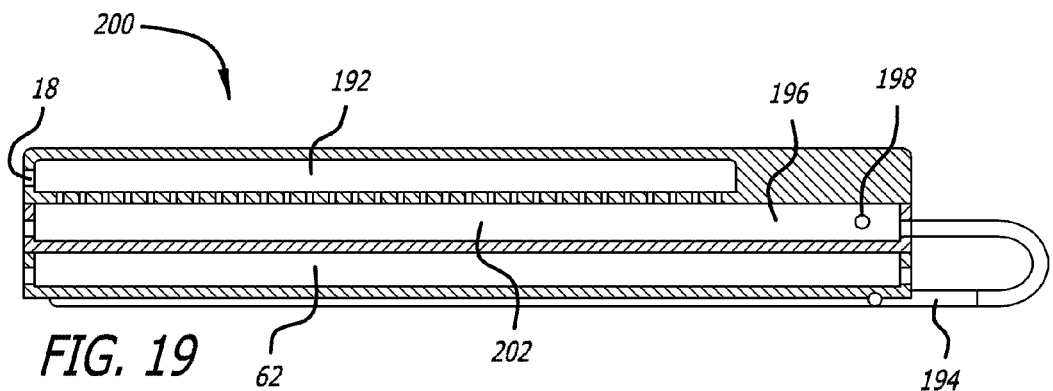
FIG. 19 illustrates a cross sectional view of a variant of the membrane reactor of FIGS. 17 and 18, wherein the pre-treatment chamber is not separated from the reaction chamber.

FIG. 19 shows a reactor sub assembly (200) which is an exemplary variant of reactor sub assembly (140) shown in FIG. 18, wherein the pre-treatment chamber is not separated from the reaction chamber.

In the reactor sub assembly (200) a portion of the reaction chamber situated close to the entry port of the reformer chamber can constitute the pre-treatment chamber. This pre-treatment of portion of the reaction chamber would be differentiated from the rest of the reaction chamber by the absence of the membrane. In other words, the membrane assembly containing the membrane would not extend into the pre-treatment chamber as illustrated in FIG. 19.

In the membrane reactor (190) shown in FIG. 19, the pre-treatment chamber section (196) is the membrane less portion that is located in front of the reaction chamber (202) that is exposed to the membrane assembly reaction area (202). During the steam reformation of hydrocarbons for example, water is vaporized by passing through a metal tubing (194) that is in contact with the external surface of the combustion chamber (62). This metal tubing may be joined either through brazing or welding to provide the most intimate contact for best thermal conduction. Water is vaporized in the metal tubing and may be further heated beyond the normal boiling point coil and enters the pre-treatment section of the reformer chamber (196). Fuel enters the pre-treatment chamber of the reformer chamber through the port (198). The fuel entry port is shown as being on the side of the vaporizer body but may be located in any manner which provides close contact between the vaporized water and fuel once they enter the pre-treatment chamber. In the pre-treatment chamber the fuel is partially converted to a gaseous mixture containing hydrogen and this gaseous mixture flows into the reaction chamber (202) that contains the membrane. This insures that the membrane surface is exposed to a reducing mixture (due to the presence of hydrogen) that would prevent the deterioration of the membrane by oxidation. Hydrogen flows through the membrane assembly, gets collected in the hydrogen plenum (192) and exits through the hydrogen exit port (18). The construction of the membrane assembly in the membrane reactor shown in FIG. 19 is similar to that described in FIG. 18.

The integration of a vaporizer and pre-reformer to a membrane reactor configuration shown in FIG. 18 to yield a membrane reactor as shown in FIG. 19 is only exemplary. The same procedure can be practiced on other membrane reactor configurations that have been described in this disclosure to produce a stacked or modular pure hydrogen producing package that contains integrated vaporization and pre-reforming capability.

A critical problem in using hydrogen separation membranes on a commercial scale relates to thermal issues with regards to reliability, lifetime and ability to withstand multiple thermal cycles. As taught in this disclosure, the membrane can be sealed by gasketing, brazing, welding (electron beam, laser, TIG, or other), diffusion bonding. Thermal cycling between room temperature and 600-650° C. (membrane temperature during reforming) increases the stress on the thin membranes which may be in the thin foil form. The introduction of hydrogen creates further difficulties because palladium based membranes absorb hydrogen and swell in volume (increases in volume). The palladium foil is particularly subjected to enormous stresses around the circumference of the joint. This is especially prevalent in rigid joints that result from using techniques such as brazing and welding (as opposed to gasketing).

In the case of gasketing, the thin foil is sealed by using removable gaskets that are housed in flanged assemblies. All of these gasket materials degrade over time (especially in the case of the oxidation of graphite when not in an inert environment) and the mechanical joining components such as bolts and screws experience elevated creep rates at high temperatures thus further weakening the seal. Thermal cycling effects amplify failure rates by inducing fatigue into the mechanical fasteners such as bolts. Sealing using gaskets allows some slippage around the gaskets that may contaminate the hydrogen stream. Furthermore, the use of flanges increases the weight of the reactor, which is undesirable for compact portable power systems.

It is possible to combine the flexibility afforded by gaskets with that of the leak-tight seal and lower weight afforded by permanent joining techniques. This hybrid joining technique that seals the foil to the support structure can reduce membrane failure and provide a reliable seal between the membrane and support structure.

FIGS. 20A, 20B and 21 show respectively an exploded, a compact and a sectional view of a membrane assembly and hydrogen plenum (150) in which the gasket is housed in a support frame. A high temperature gasket (158) made of a material such as graphite, ceramic, vermiculite, or other appropriate material is incorporated at the interface of the membrane foil (156) and a frame (162) is placed on top which secures the foil to the support. This assembly is then placed on top of the perforated or otherwise porous support (154). The assembly may then be compressed using a clamp. The areas outside of the gasket can be brazed using vacuum brazing or other appropriate brazing methods with the braze applied to the areas to be joined prior to compressing the gasket in place. Alternately, the elements of the membrane assembly may be welded around the perimeter using appropriate welding techniques taking care not to damage the foil. After sealing, the clamps are removed and the membrane assembly is integrated into the hydrogen plenum (152) using brazing or welding. FIG. 21 shows a section view of the membrane assembly that is integrated with the hydrogen plenum. When exposed to a hydrogen containing gas mixture at appropriate conditions, hydrogen permeates through the membrane foil (156) and flows through the perforations (166) or porous structure of the membrane support plate (154) and into the hydrogen plenum (152). Hydrogen then exits the plenum through the hydrogen exit port (164). The membrane assembly described in FIGS. 20A, 20B and 21 can be integrated with a reaction chamber and combustion chamber to yield a membrane reactor as described in this disclosure.

Figure 22:
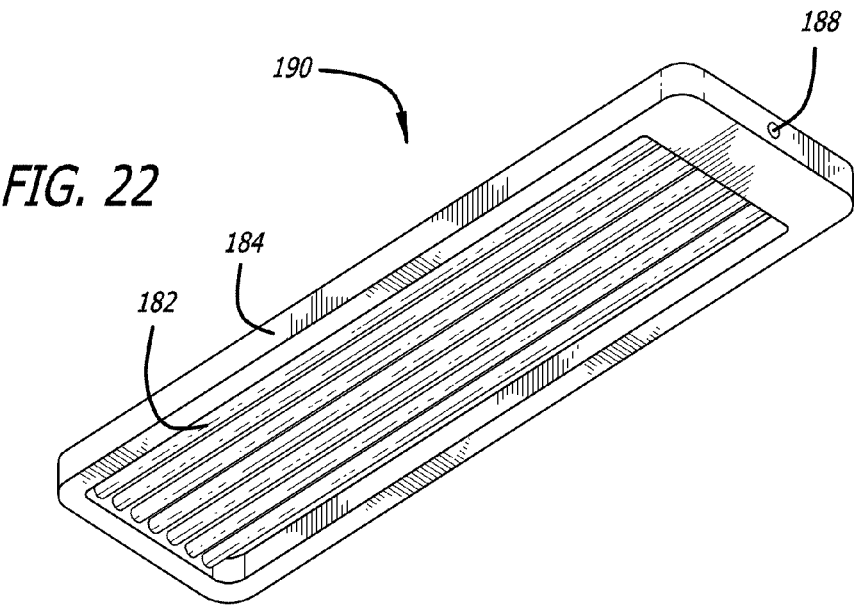
FIG. 22 illustrates a membrane assembly comprising of tubular membrane elements.
Figure 23:
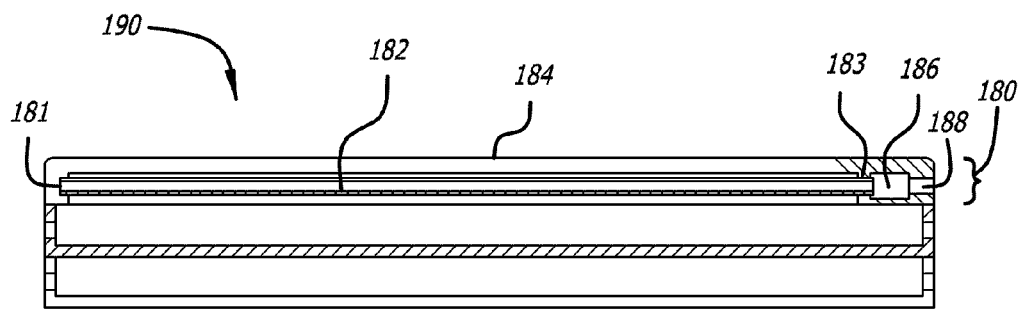
FIG. 23 illustrates a membrane reactor consisting of a tubular membrane assembly of FIG. 22.

FIG. 22 shows an exemplary membrane assembly (180) wherein the membrane components described elsewhere in the disclosure are replaced by tubular components. An effect of this replacement is that increased hydrogen production rates can be achieved with respect to the membrane assemblies including non-tubular membrane components. The membrane assembly (180) as shown in FIG. 22, consists of a housing (184) for the tubular membranes component (182) and comprises of a plate with closed ended cavities (181) for the tubular membranes to be positioned, shown in FIG. 23. The generated hydrogen permeates through the surface of the tubes flow into a collection area (186). The tubes are positioned in an opening (183) that is located opposite to (181) and open into a collection header (186) as shown in FIG. 23. The hydrogen exits the hydrogen exit port (188) to the point of use. The tubes may be sealed into the housing brazing methods, preferably under vacuum brazing conditions described above.

FIG. 23 shows an exemplary membrane reactor (190) which includes a membrane sub assembly (180) as shown in FIG. 22, integrated with a combustion chamber. Other than differences in the membrane assemblies, this membrane reactor is similar to the membrane reactor shown in FIG. 8. The membrane assembly (180) shown in FIG. 22 contains seven tubular elements with a total membrane surface area of 110 $cm^2$. A planar membrane which is sized to fit in the space accommodating the tubes would possess a surface area of 58 $cm^2$. Therefore an almost 2-fold increase in the surface area can be realized using a membrane assembly as shown in FIG. 22, which should translate to a 2-fold increase in the hydrogen permeation rate if the membrane thickness are assumed to the be the same.

The extremities of the tubular membrane components could be composed of materials not permeable to hydrogen to allow for sealing of the tubes with the membrane assembly. Accordingly, the tubular membrane components can be dead-ended or closed ended at one end of the component.

In the examples taught below the hydrogen separation membrane constitutes a 25 micron thick Pd/Ag foil. It is claimed here that membrane foil of different thicknesses can also be incorporated in the same manner as that followed for the 25 micron thick foil.

The membrane reactors, the reactor sub-assemblies and the membrane assemblies herein described can be included in a hydrogen generator, and in particular in an ammonia based or hydrocarbon based hydrogen reactor.

FIG. 24 shows an exemplary ammonia based hydrogen generator including the membrane reactor of FIG. 8. The membrane reactor (70) is connected to a fuel supply (204) through a reaction fuel supply line (205) and to a combustion fuel supply (207) through a combustion supply line (211). The membrane reactor (70) is also connected to an air supply (203) through a air supply line (206). The hydrogen generator also includes a combustion byproduct line (208) and a tail gases supply line (209).

FIG. 25 shows an exemplary hydrocarbon based hydrogen generator including the membrane reactor of FIG. 8. In the hydrocarbon based hydrogen generator, the membrane reactor (70) is connected to a fuel supply (204) through a reaction fuel supply line (205) and to a combustion fuel supply (207) through a combustion supply line (211). The membrane reactor (70) is also connected to an air supply (203) through a air supply line (206). The membrane based hydrogen generator also includes a combustion byproduct line (208) and a tail gases supply line (209). A water supply (212) connected to the membrane reactor (70) through a water supply line (213) is also included.

The following examples are provided to describe the invention in further detail. These examples, which set forth a specific mode presently contemplated for carrying out the disclosure, are intended to illustrate and not to limit the invention.

EXAMPLES

Example 1

Hydrogen Flux Through a Reformer Sub Assembly in which the Membrane is Supported on a Sintered Porous Metal Substrate A gas mixture consisting of hydrogen and nitrogen in the nominal volumetric ratio of 75% $H_2$ and 25% $N_2$ and at a nominal flow rate of 1500 sccm was fed into a reaction chamber as shown in FIG. 1 after heating the chamber to about 450° C. The reaction sub assembly was constructed of SS 304. The membrane consisted of a Pd/Ag foil of nominal composition 75% Pd/25% Ag and had a surface area of 23 $cm^2$.

The membrane foil, 25 microns in nominal thickness, was supported on a sintered porous stainless steel 316L substrate that possessed a nominal porosity of 41% (Mott Corp). The reactor sub assembly was placed in a Watlow electrical furnace which allowed for increasing the temperature of the furnace using a suitable temperature controller (Omega). The reaction chamber contained a 40 ppi FeCrAlY metal foam substrate to provide uniform flow and heat distribution.

The gas mixture was preheated by flowing through a ⅛ in. OD SS 316 tubing coil that was also situated in the Watlow furnace. The hydrogen flux (sccm/$cm^2$) through the reactor sub assembly was measured, while the reactor sub assembly was operating at a nominal temperature of 600° C. and nominal pressure of 5.8 bar. The pressure on the permeate side of the membrane was therefore maintained at atmospheric pressure. Stability of the flux was measured.

The results, reported on FIG. 26, show a stable hydrogen flux observed during the testing period that spanned over 50 hours of continuous operation.

Example 2

Hydrogen Flux Through a Reactor Sub Assembly in which the Membrane was Supported on a Solid Plate Containing Perforations The test as described in Example 1 was repeated using reactor sub assemblies that were identical to that used in Example 1, except for the fact that the membrane foil was supported on a solid SS 304 plate that contained small evenly spaced holes 1/32" diameter with a total exposed surface area of 0.23 in$^2$. In particular, hydrogen flux (sccm/cm$^2$) was passed at 600° C. and at a nominal pressure of 5.8 bar through two identically construed Units 1 and 2, at various temperature cycles. Each temperature cycle was between ambient temperature and 600° C.

Figure 27:
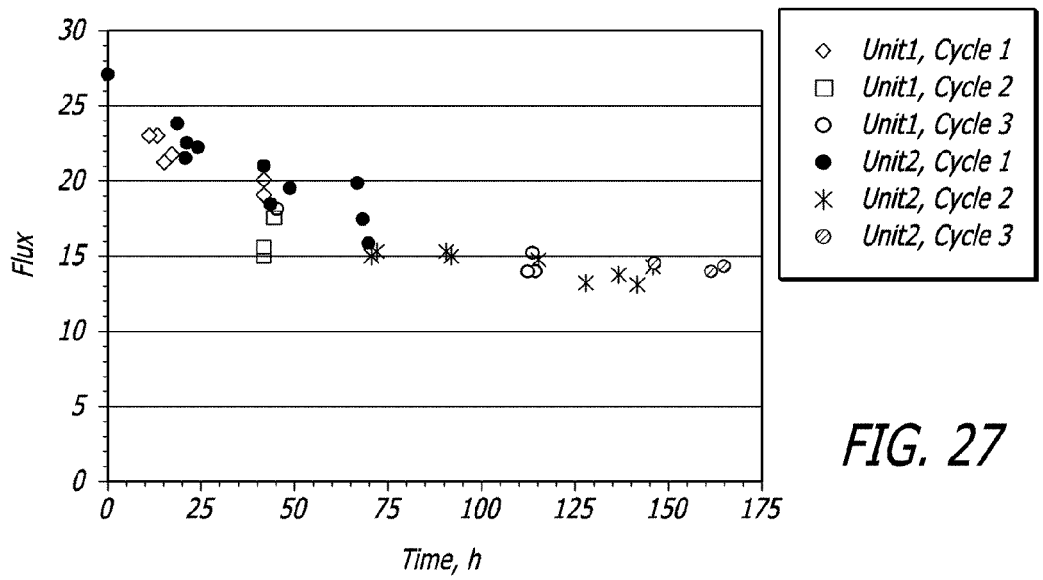
FIG. 27 shows a diagram reporting measurements of the hydrogen flux (sccm/cm$^2$) through a variant of the reactor sub assembly of FIG. 1 described in Example 2. On the y-axis the hydrogen flux is reported. On the x-axis the test time is reported.

The pressure on the permeate side of the membrane was maintained at atmospheric pressure. The results reported in FIG. 27 show an approximately 30% decrease in hydrogen flux was observed with time. The membrane was found to be very stable to thermal cycling between ambient temperature and 600° C., as no decrease in the purity of hydrogen was observed. The nominal hydrogen purity as assessed using a Shimadzu GC 17 gas chromatograph was found to be >99.99% (impurities if any were below the detection limits of the gas chromatograph). The decrease in flux is attributed to the gradual creep of the membrane foil into the holes of the support at temperature, which results in a decrease in the effective surface area of the membrane that is available for hydrogen transport. The test was repeated for an identical unit, Unit 2, and both units exhibited the same behavior of decreasing flux when subjected to the evaluation described above (see FIG. 27).

Example 3

Hydrogen Flux Through a Reactor Sub Assembly in which the Membrane was Supported on a Sintered Porous Substrate The substrate also behaved as a flow channel for transport of hydrogen to the exit ports of the device.

A gas mixture consisting of hydrogen and nitrogen in the nominal volumetric ratio of 75% $H_2$ and 25% $N_2$ and at a nominal flow rate of 3600 sccm was fed the reactor sub assembly as shown in FIG. 5 after heating the reactor to about 450° C. The reactor sub assembly was constructed of 304L stainless steel. The membrane consisted of a Pd/Ag foil of nominal composition 75% Pd/25% Ag and had a surface area of 55 cm$^2$. The membrane foil was supported on a sintered porous 316 stainless steel substrate that possessed a nominal porosity of 41% (Mott Corp). The membrane reactor was placed in a Watlow electrical furnace which allowed for increasing the temperature of the furnace using a suitable temperature controller (Omega). The reaction chamber contained a 40 ppi Inconel® 625 metal foam substrate to provide uniform flow and heat distribution.

Figure 28:
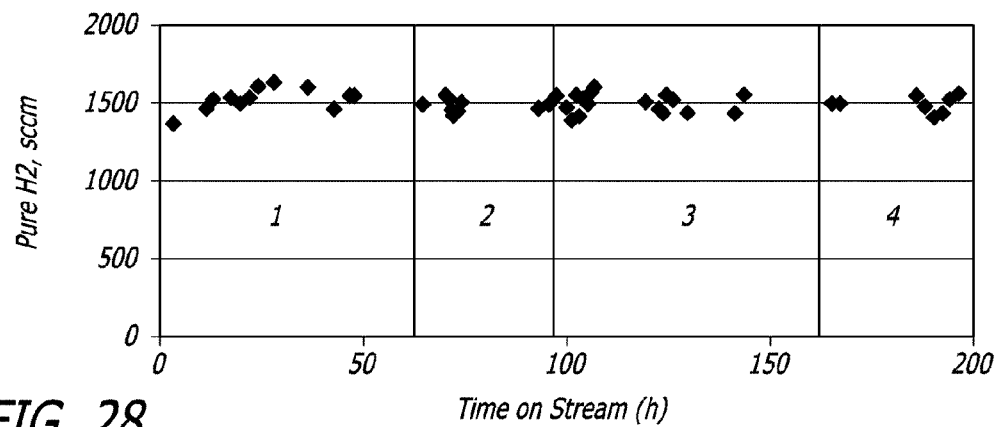
FIG. 28 shows a diagram reporting measurements of the pure hydrogen production rate (sccm) through the reactor sub assembly of FIG. 5 described in Example 3. On the y-axis the production rate is reported. On the x-axis the test time is reported.

The gas mixture was preheated by flowing through a 1/8 in. OD SS 316 tubing coil that was also located in the Watlow furnace, and introduced into the reactor sub assembly while operating at a nominal temperature of 600° C. to 625° C. and nominal pressure of 5.8 bar. Four thermal cycles between ambient temperature 625° C. was performed. The pressure on the permeate side of the membrane was maintained at atmospheric pressure. As shown in FIG. 28 the nominal pure hydrogen production rate was measured to be 1500 sccm (nominal flux of 27 sccm/cm$^2$), and was unaffected by thermal cycling between ambient temperature and 625° C. The nominal hydrogen purity as assessed using a Shimadzu GC 17 gas chromatograph was found to be >99.99% (impurities if any were below the detection limits of the gas chromatograph). The membrane sealing method was found to be very stable to thermal cycling both pure hydrogen production rates and hydrogen purity remain stable with time.

Example 4

Pure Hydrogen Production from a $H_2$/$N_2$ Feed Using a Hydrogen Generator Containing a Membrane Reactor as Shown in FIGS. 13 and 14

A gas mixture consisting of hydrogen and nitrogen in the nominal volumetric ratio of 75% $H_2$ and 25% $N_2$ and at a nominal flow rate of 3800 sccm was fed into a membrane reactor as shown in FIGS. 13 and 14 after heating the reactor to about 550° C. The membrane reactor was constructed of 304L stainless steel and contained a combustion chamber that was sandwiched between the two reactor chambers that were in fluid communication with each other. Each reaction chamber contained a membrane that consisted of a Pd/Ag foil (Johnson Matthey) of nominal composition 75% Pd/25% Ag and had a surface area of 55 cm$^2$. The membrane foil was supported on a sintered porous SS 316 substrate that possessed a nominal porosity of 41% (Mott Corp). Each reactor chamber contained a 40 ppi Inconel® 625 metal foam substrate. The metal foam substrate was coated with a suitable catalyst material that was effective for producing hydrogen from ammonia by cracking.

The combustion chamber contained a 40 ppi FeCrAlY metal foam substrate that was coated with a suitable combustion catalyst. A 3/8 inch OD Inconel® 600 tubing was wrapped around and tack welded to the combustion chamber as shown in FIG. 14 to provide a degree of pre-heat to the feed stream prior to entry into the reaction chamber. Combustion was initiated by room temperature light-off using hydrogen/air mixtures, and when the catalyst temperature reached about 200° C., the hydrogen fuel was replaced with propane. Catalytic and flameless combustion of propane was carried out in such a manner that the catalyst temperatures in the reaction chambers were between 575 to 625° C. The membrane reactor was insulated using Dynaguard™ microporous silica insulation as sold by Thermodyne Corporation (Elkhart, Ind.)

Pure hydrogen production rates of 2400 to 2700 sccm were measured during this test at a nominal reactor chamber pressure of 5.8 bar. The nominal hydrogen purity as assessed using a Shimadzu GC 17 gas chromatograph was found to be >99.99% (impurities if any were below the detection limits of the gas chromatograph). The tail gas stream exiting the reaction chamber consisted of 30% $H_2$ and 70% $N_2$ by volume.

Example 5

Pure Hydrogen Production from Anhydrous Ammonia Using a Hydrogen Generator Containing a Membrane Reactor as Shown in FIGS. 13 and 14

After demonstrating pure hydrogen production from a $H_2$/$N_2$ containing feed as described in Example 4, the $H_2$/$N_2$ feed mixture was replaced by anhydrous ammonia. The flow rates of ammonia feed, membrane reject and pure hydrogen during the production of pure hydrogen from ammonia were measured as a function of test time. The results are reported on FIG. 29.

Figure 29:
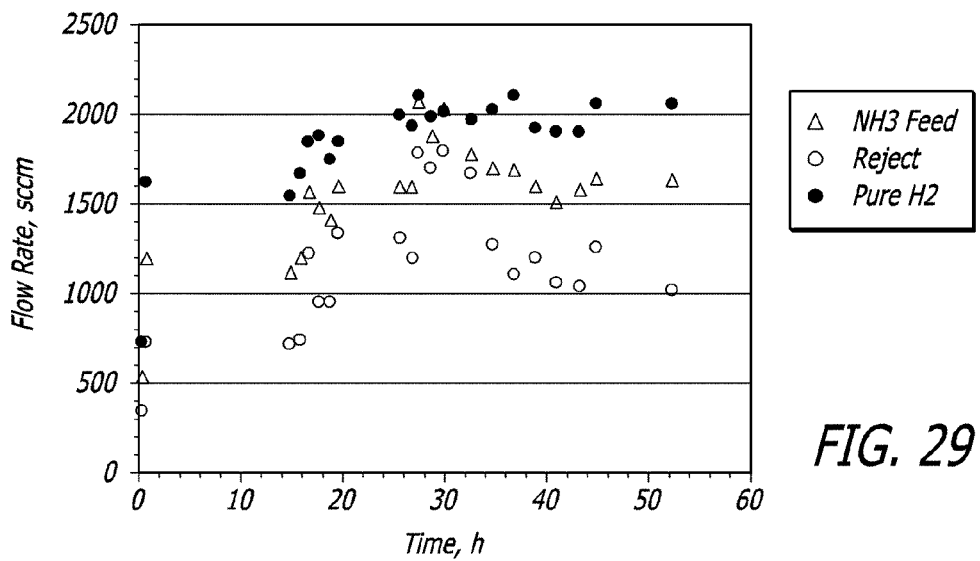
FIG. 29 shows a diagram reporting measurements of the flow rate of ammonia through the reactor sub assembly of FIGS. 13 and 14, described in Example 5. On the y-axis the flow rates are reported. On the x-axis the test time is reported.

As shown in FIG. 29, pure hydrogen at flow rates of 2000 sccm was produced in a very stable fashion. The nominal hydrogen purity as assessed using a Shimadzu GC 17 gas chromatograph was found to be >99.99% (impurities if any were below the detection limits of the gas chromatograph).

Now the reactor tail gases containing hydrogen and nitrogen and trace ammonia (<4000 ppm ammonia) can be routed back to the combustion chamber to supply heat to the reactor chamber. This action would reduce the amount of an external fuel such as propane that needs to be fed into the combustion chamber. In fact, it is quite possible to generate a tail gas stream whose heat content is equivalent to a large fraction or even the entire heat requirement of the hydrogen generation process by changing or "tuning" the flow rate of the ammonia feed.

Figure 30:
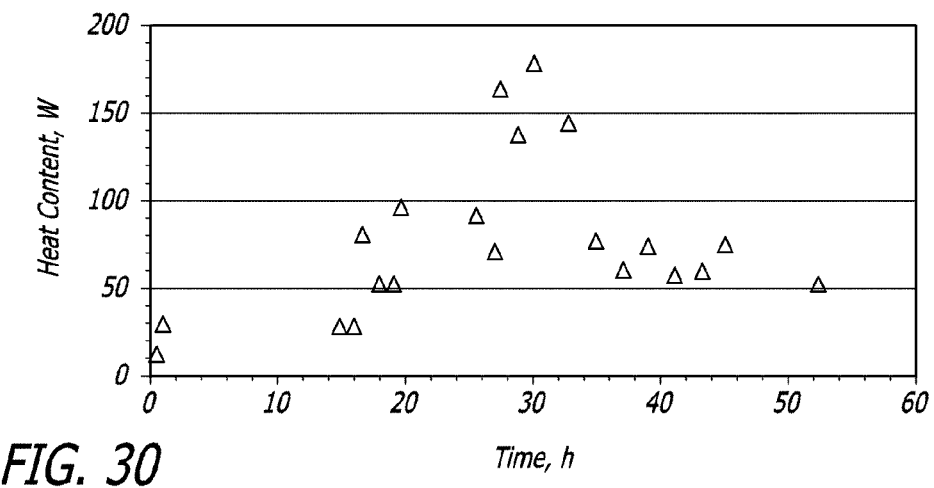
FIG. 30 shows a diagram reporting the heat content of the membrane reject stream described in Example 5. On the y-axis the heat content is reported. On the x-axis the test time is reported.

FIG. 30 shows the heat content of the membrane reject stream based on lower heating value during the pure hydrogen production process. Comparing FIGS. 29 and 30, it becomes evident that a tail gas stream with a heat content of about 180 W can be generated while maintaining a constant pure hydrogen production of 2000 sccm. Routing such a tail gas stream back into the combustion chamber resulted in an overall thermal efficiency of 60%, where thermal efficiency is defined as the ratio of the lower heating value of pure hydrogen to that of feed streams to both reaction chamber and combustion chamber.

Example 6

Pure Hydrogen Production from Anhydrous Ammonia Using a Hydrogen Generator Containing a Membrane Reactor as Shown in FIGS. 15a, 15b and 16

Anhydrous ammonia at flow rates of 500 sccm to 1200 sccm was fed into a membrane reactor as shown in FIG. 17 after heating the reactor to about 575° C. The membrane reactor was constructed of 304L stainless steel and contained a combustion chamber that was sandwiched between the two reaction chambers that were in fluid communication with each other. Each reaction chamber contained a membrane that consisted of a Pd/Ag foil (Johnson Matthey) of nominal composition 75% Pd/25% Ag and had a surface area of 90 $cm^2$. The nominal thickness of the membrane foil was 25 microns. The membrane foil was supported on a sintered porous 316 stainless steel substrate that possessed a nominal porosity of 41% (Mott Corp). Each reaction chamber contained a 40 ppi Inconel® 625 metal foam substrate of that was coated with a suitable catalyst. The metal foam substrate was coated with a suitable catalyst material that was effective for producing hydrogen from ammonia by cracking.

The combustion chamber contained a 40 ppi FeCrAlY metal foam substrate that was coated with a suitable combustion catalyst. Combustion was initiated by first heating the leading edge of the catalyst using a Nichrome resistance wire that was in contact with the leading edge of the catalyst. When the temperature of the leading edge of the catalyst reached around 200° C., the charge to the resistance wire was stopped and a mixture of propane and air was fed to the combustion chamber to produce heat by catalytic combustion.

Alternately, room temperature light-off of the catalyst was accomplished using hydrogen/air mixtures, and when the catalyst temperature reached about 200° C., the hydrogen fuel was replaced with propane. Catalytic and flameless combustion of propane was carried out in such a manner that the catalyst temperatures in the reaction chambers were between 575 to 625° C. The membrane reactor was insulated using the Dynaguard™ microporous silica insulation as sold by Thermodyne Corporation (Elkhart, Ind.).

Figure 31:
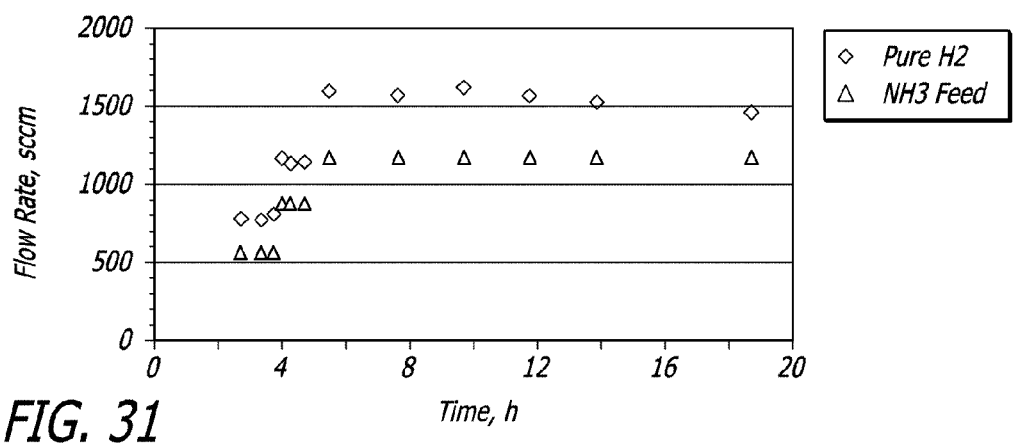
FIG. 31 shows a diagram reporting the flow rate of ammonia and pure hydrogen through the reactor sub assembly of FIGS. 15A, 15B, and 16 as described in Example 6. On the y-axis the flow rates are reported. On the x-axis the test time is reported.

Pure hydrogen production rates of 1500 sccm were measured during this test at a nominal reaction chamber pressure of 5.8 bar as shown in FIG. 31. The nominal hydrogen purity as assessed using a Shimadzu GC 17 gas chromatograph was found to be 99.7%. The impurities in the hydrogen stream consisted of minor levels of N2 (2000 ppm), CO (100 ppm), CH4 (150 ppm) and CO2 (200 ppm) that are believed to originate either from outgassing of the graphite gaskets or seepage around the gaskets. In addition, trace levels of ammonia of nominal concentration of 4 ppm (measured using Drager tubes) was present in the hydrogen stream. This ammonia impurity was easily removed by flowing the hydrogen stream through a bed of molecular sieve 4A adsorbents (25/35 mesh particles, Grade 514, Grace Davison).

The tail gas stream exiting the reaction chamber consisted of 22 to 28% $H_2$, 72 to 77% $N_2$ by volume and 300 to 1000 ppm ammonia. This tail gas stream was routed back into the combustion chamber to supply heat to the reaction chambers. Routing such a tail stream back into the combustion chamber resulted in an overall thermal efficiency of 63%, where thermal efficiency is defined as the ratio of the lower heating value of pure hydrogen to that of feed streams to both reaction chamber and combustion chamber.

Example 7

Pure Hydrogen Production from Synthetic Kerosene in a Hydrogen Generator Containing a Membrane Reactor as Shown in FIG. 8

Synthetic kerosene fuel flowing at a nominal feed rate of 0.16 ml/min was contacted with distilled water flowing at a nominal feed rate of 0.55 ml/min and fed into a pre-treatment chamber of a membrane reactor as shown in FIG. 8. The pre-treatment chamber in this example contained a 40 ppi FeCrAlY metal foam substrate that was coated with a suitable catalyst. The pre-treatment chamber was heated by an electrical heating tape and the pre-treatment chamber was maintained at 550 to 580° C. and 5.8 bar. The pre-treatment chamber was used to convert the kerosene fuel to a mixture containing hydrogen along with light-hydrocarbons and carbon oxides.

The hot hydrogen containing gas stream was then fed into the reaction chamber of the membrane reactor whose configuration is as shown in FIG. 8. The hydrogen membrane in the reactor comprised of a 75% Pd/25% Ag foil (Johnson Matthey) with a nominal thickness of 25 microns and surface area of 45 $cm^2$. The membrane foil was supported on a sintered porous 316 stainless steel substrate that possessed a nominal porosity of 41% (Mott Corp).

Figure 32:
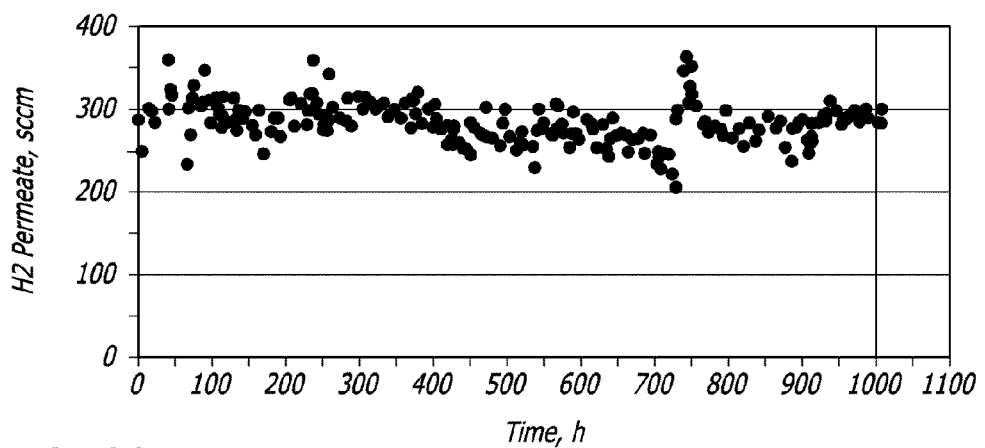
FIG. 32 shows a diagram reporting measurements of the hydrogen production rate (sccm) through the reactor sub assembly of FIG. 8 described in Example 7. On the y-axis the production rate is reported. On the x-axis the test time is reported.

The reaction chamber and combustion chambers each contained a 40 ppi FeCrAlY metal foam substrate that was coated with suitable catalysts. While operating at a nominal reaction temperature of 610° C. and 5.8 bar, pure hydrogen was produced at nominal flow rates of 300 sccm for over 1000 h as shown in FIG. 32.

Combustion was initiated by room temperature light-off using hydrogen/air mixtures, and when the catalyst temperature reached about 200° C., the hydrogen fuel was replaced with propane.

Catalytic and flameless combustion of propane was carried out in such a manner that the catalyst temperatures in the reactor chambers were between 575 to 625° C. The pure hydrogen exiting the reactor (before methanizer) contained trace levels of CO, $CO_2$ and $CH_4$ as impurities as shown in Table I.

TABLE I

Purity of hydrogen permeate.

| Sample | TOS (h) | CH4 (ppm) | CO2 (ppm) | CO (ppm) | H2 purity (%) |
|---|---|---|---|---|---|
| Before methanizer | 980 | 285 | 271 | 206 | 99.92 |
| After methanizer | 981 | 820 | 51 | n.d | 99.91 |

The hydrogen product composition was assessed using a pulsed helium ionization detector and a flame ionization detector.

When the hydrogen stream was passed through a bed of methanation catalyst (T-4308 catalyst; Süd Chemie) maintained at 175° C. and at a nominal space velocity of 2000 h$^{-1}$, all of the CO and a large fraction of the $CO_2$ were converted to $CH_4$ resulting in a hydrogen stream of 99.91% purity that was suitable for PEM fuel cell applications. The hydrocarbon conversion calculated as $C_{CO+CO2}/C_{products}$ was 78% with the carbon balance being within 10%.

The nominal molar composition of the reactor tail gas stream was 48.4% $H_2$, 3.7% CO, 11.7% CH4 and 36.2% $CO_2$ on a dry basis. This tail gas stream which had a nominal heating value of 55 to 60 W was routed back to the combustor to provide heat to drive the reforming reaction.

Accordingly, the pure hydrogen stream contained impurities such as $CH_4$, $CO_2$ and CO. These impurities can be removed as required by using a suitable hydrogen polishing step. For example, the presence of CO in the hydrogen stream that is fed to a PEM fuel cell can result in a deterioration of fuel cell performance. As shown in Table I, CO was eliminated by flowing the hydrogen gas stream exiting the reactor through a methanation catalyst bed (example, T-4308 catalyst supplied by Süd Chemie) that was situated close to the reactor outlet. After a time on stream (TOS) of about 1010 h, the synthetic kerosene feed was cut-off and was replaced by propane.

The following Example 8 shows pure hydrogen production from propane using the same hydrogen generator and exemplifies multi-fuel reforming; that is, hydrogen production from different fuels in a single membrane reactor unit.

Example 8

Pure Hydrogen Production from Propane in a Hydrogen Generator Containing a Membrane Reactor as Shown in FIG. 8

Figure 33:
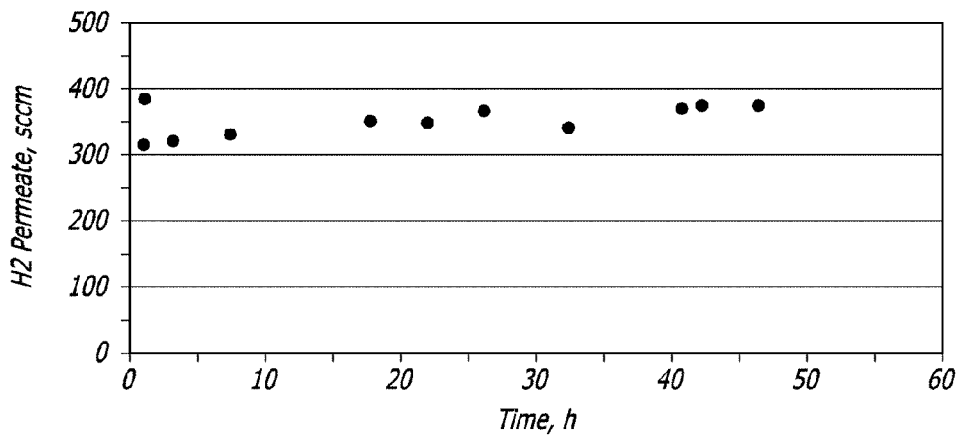
FIG. 33 shows a diagram reporting measurements of the pure hydrogen production rate (sccm) through the reactor sub assembly of FIG. 8 described in Example 8. On the y-axis the production rate is reported. On the x-axis the test time is reported.

After demonstrating pure hydrogen production from kerosene for about 1010 h as described in Example 7, the kerosene feed was cut-off and was replaced by propane. Results of the measurements performed are reported in FIG. 33.

Propane flowing at a nominal flow rate of 100 sccm was contacted with distilled water flowing at a nominal feed rate of 0.7 ml/min and fed into a pre-treatment chamber and then into the reaction chamber in the same manner as described in Example 7. While operating at a the same nominal reaction temperature of 610° C. and 5.8 bar, pure hydrogen was produced at nominal flow rates of 350 sccm as shown in FIG. 31 demonstrating multi-fuel reforming capabilities using the membrane reactor shown in FIG. 8. The hydrocarbon conversion calculated as $C_{CO+CO2}/C_{products}$ was 70% with the carbon balance being within 10%. The nominal molar composition of the membrane reject stream was 49.7% $H_2$, 4.2% CO, 14.4% $CH_4$ and 31.7% $CO_2$ on a dry basis. This membrane reject stream which had a nominal heating value of 106 to 110 W could be routed back to the combustor to provide heat to drive the reforming reaction.

Example 9

Pure Hydrogen Production from Kerosene in Membrane Reactor that Contains an Integrated Vaporizer and Pre-Treatment Chamber as Shown in FIGS. 17 and 18

Figure 34:
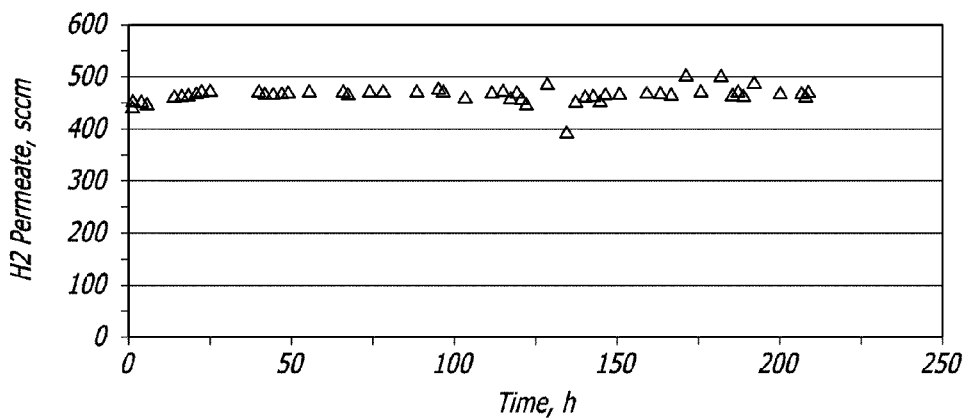
FIG. 34 shows a diagram reporting measurements of the pure hydrogen production rate (sccm) through the reactor sub assembly of FIGS. 17 and 18 described in Example 9. On the y-axis the production rate is reported. On the x-axis the test time is reported.

Water flowing at a nominal flow rate of 0.68 ml/min was vaporized to steam in a tubing that was welded to the skin of the pre-treatment chamber and was contacted with synthetic kerosene fuel flowing at a nominal feed rate of 0.22 ml/min in the pre-treatment chamber. The pre-treatment chamber in this example contained a 40 ppi FeCrAlY metal foam substrate that was coated with a suitable catalyst. The pre-treatment chamber was integrated with the combustion chamber and was heated by heat exchange with the combustion chamber. Feed pre-heating and pre-reformation was realized at an average temperature of 555° C. and at 5.8 bar. The hot pre-reformed stream was then fed into the reaction chamber of the membrane reactor whose configuration is as shown in FIGS. 17 and 18. The hydrogen membrane in the reactor comprised of a 75% Pd/25% Ag foil (Johnson Matthey) with a nominal thickness of 25 microns and surface area of 45 cm$^2$. The membrane foil was supported on a sintered porous 316 stainless steel substrate that possessed a nominal porosity of 41% (Mott Corp). The reaction chamber and combustion chambers each contained a 40 ppi FeCrAlY metal foam substrate that was coated with suitable catalysts. While operating at a nominal reaction temperature of 610° C. and 5.8 bar, pure hydrogen was produced at nominal flow rates of 460 to 470 sccm as shown in FIG. 34.

Combustion was initiated by room temperature light-off using hydrogen/air mixtures, and when the catalyst temperature reached about 200° C., the hydrogen fuel was replaced with propane.

TABLE II

Purity of hydrogen permeate.

| TOS (h) | $CH_4$ (ppm) | $CO_2$ (ppm) | CO (ppm) | $H_2$ purity (%) |
|---|---|---|---|---|
| 42 | 3.58 | 9.98 | 2.71 | 99.998 |
| 113 | 5.99 | 22.31 | 3.06 | 99.996 |
| 187 | 9.28 | 47.83 | 3.7 | 99.994 |

The hydrocarbon conversion calculated as $C_{CO+CO2}/C_{products}$ was 73% with the carbon balance being within 5%.

Catalytic and flameless combustion of propane was carried out in such a manner that the catalyst temperatures in the chambers were between 575 to 630° C. The purity of hydrogen exiting the reactor was assessed to be 99.998% and contained trace levels of CO, $CO_2$ and $CH_4$ as impurities as shown in Table II. The hydrogen product composition was assessed using a pulsed helium ionization detector and a flame ionization detector. The nominal molar composition of the tail gas stream was 38.33% $H_2$, 3.74% CO, 16.98% $CH_4$ and 40.95% $CO_2$ on a dry basis. This tail gas stream which had a nominal heating value of 84 W was routed back to the combustor to provide heat to drive the reforming reaction.

Example 10

Pure Hydrogen Production During "Hot-Swapping" of Fuels from Kerosene to Propane in a Membrane Reactor that Contains an Integrated Vaporizer and Pre-Treatment Chamber as Shown in FIGS. 17 and 18

Figure 35:
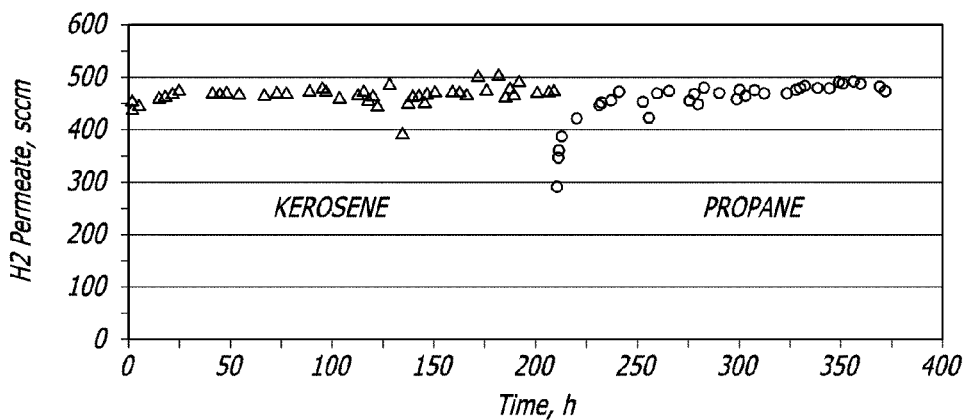
FIG. 35 shows a diagram reporting measurements of the pure hydrogen production rate (sccm) through the reactor sub assembly of FIGS. 17 and 18 described in Example 10. On the y-axis the production rate is reported. On the x-axis the test time is reported.

As a continuation of Example 9, kerosene fuel was replaced with propane at about 210 h into the test without changing other operating parameters. That is, the fuels were replaced during a "hot swap", which is a replacement of the hydrogen generating fuel when the generator is in a steady state. The target was to maintain hydrogen production rates at the same level as that measured when kerosene was used as the fuel. Water flowing at a nominal flow rate of 0.8 ml/min was vaporized and contacted with propane flowing at a nominal flow rate of 200 sccm. As shown in FIG. 35, this target was realized as hydrogen production rates remained fairly flat in spite of the fuel swap.

Hydrogen permeate samples were collected and sent analyzed at the laboratories of Matheson Trigas. As shown in Table III, hydrogen purity was about 99.99%. The hydrogen product composition was assessed using a pulsed helium ionization detector and a flame ionization detector. At these purity levels, the hydrogen product gas can be directly fed to a PEM fuel cell.

TABLE III

Purity of hydrogen permeate after the swap from kerosene to propane

| TOS (h) | $CH_4$ (ppm) | $CO_2$ (ppm) | CO (ppm) | $H_2$ purity (%) |
|---|---|---|---|---|
| 279 | 15.05 | 30.23 | 5.72 | 99.995 |
| 354 | 26.26 | 106.04 | 12.14 | 99.986 |

The hydrocarbon conversion calculated as $C_{CO+CO2}/C_{products}$ was 58%. The nominal molar composition of the tail gas stream was 42.19% $H_2$, 2.64% CO, 24.82% $CH_4$ and 30.35% $CO_2$ on a dry basis.

Example 11

Pure Hydrogen Production from Alcohol-Water Mixtures in a Membrane Reactor that Contains an Integrated Vaporizer and Pre-Treatment Chamber as Shown in FIGS. 17 and 18

Alcohol-water mixtures (alcohol=ethanol, methanol) flowing at a nominal flow rate of 1.0 to 1.5 ml/min was fed to the pre-treatment chamber. The pre-treatment chamber in this example contained a 40 ppi FeCrAlY metal foam substrate that was coated with a suitable catalyst. The pre-treatment chamber was integrated with the combustion chamber and was heated by heat exchange with the combustion chamber. Feed pre-heating and pre-reformation was realized at an average temperature of 555° C. and at 5.8 bar. The hot pre-reformed stream was then fed into the reaction chamber of the membrane reactor whose configuration is as shown in FIGS. 17 and 18. The hydrogen membrane in the reactor comprised of a 75% Pd/25% Ag foil (Johnson Matthey) with a nominal thickness of 25 microns and surface area of 45 cm². The membrane foil was supported on a sintered porous 316 stainless steel substrate that possessed a nominal porosity of 41% (Mott Corp). The reaction chamber and combustion chambers each contained a 40 ppi FeCrAlY metal foam substrate that was coated with suitable catalysts. While operating at a nominal reaction temperature of 625° C. and 5.8 bar, pure hydrogen was produced at nominal flow rates of about 400 sccm as summarized in Table IV.

TABLE IV

Pure Hydrogen Production from Alcohol-Water Mixtures

| Feed | Steam:Carbon | Feed rate (ml/min) | Pure $H_2$ rate (sccm) | $X_{HC}$ (%) | Tail gas composition (dry, %) |
|---|---|---|---|---|---|
| Ethanol-Water | 3.2 | 1.52 | 389 | 66.1 | $H_2$: 48.0%; CO = 2.9%; $CH_4$ = 17.7%; $CO_2$ = 31.4% |
| Methanol-water | 2.0 | 1.08 | 390 | 68.4 | $H_2$: 40.8%; CO = 5.9%; $CH_4$ = 18.9%; $CO_2$ = 34.4% |

In Table IV, the hydrocarbon conversion ($X_{HC}$) was calculated as $C_{CO+CO2}/C_{products}$ While methods to incorporate palladium based hydrogen separation foils in pure hydrogen producing devices are described in this disclosure, the procedures should also be applicable to membranes that have been deposited on porous substrates, preferably porous metal substrates.

In summary, a hydrogen generator comprising a hydrogen membrane reactor, a fuel supply, a reaction fuel supply line, an air supply, an air supply line, a combustion fuel supply line, a tail gas supply line, a combustion by-product line for transporting combustion by-products from the combustion chamber, and a reaction product line. A membrane assembly to be joined to a reactor chamber of a hydrogen generator, which comprises a membrane; and a membrane support comprising a sintered porous metal. A reactor assembly comprising a reaction chamber containing a porous metal substrate, two membrane assemblies, a fuel supply, a reaction fuel supply line, and a tail gas supply line and a reaction product line. Methods associated with the hydrogen generator, membrane assembly and reactor assembly.

Figure 36:
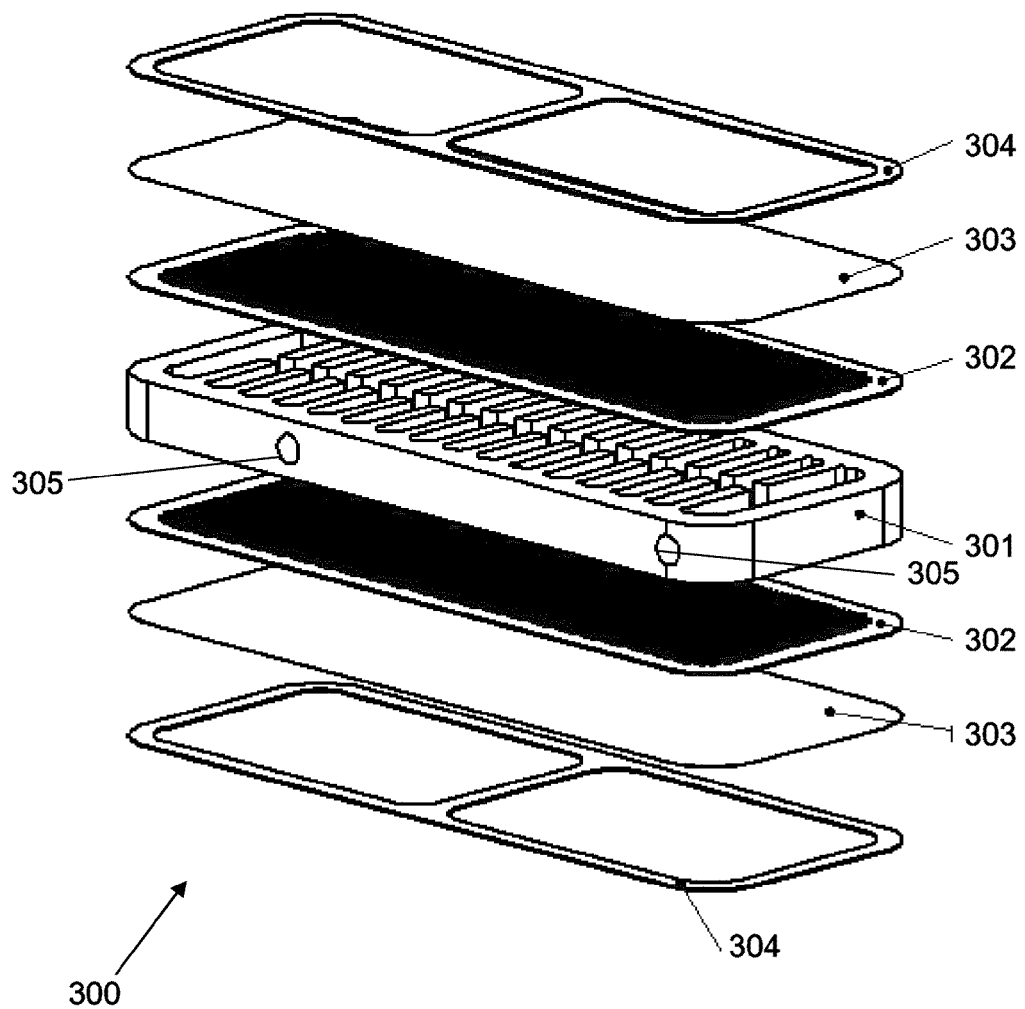
FIG. 36 illustrates an exploded isometric view of a planar membrane module that contains two membranes
Figure 40:
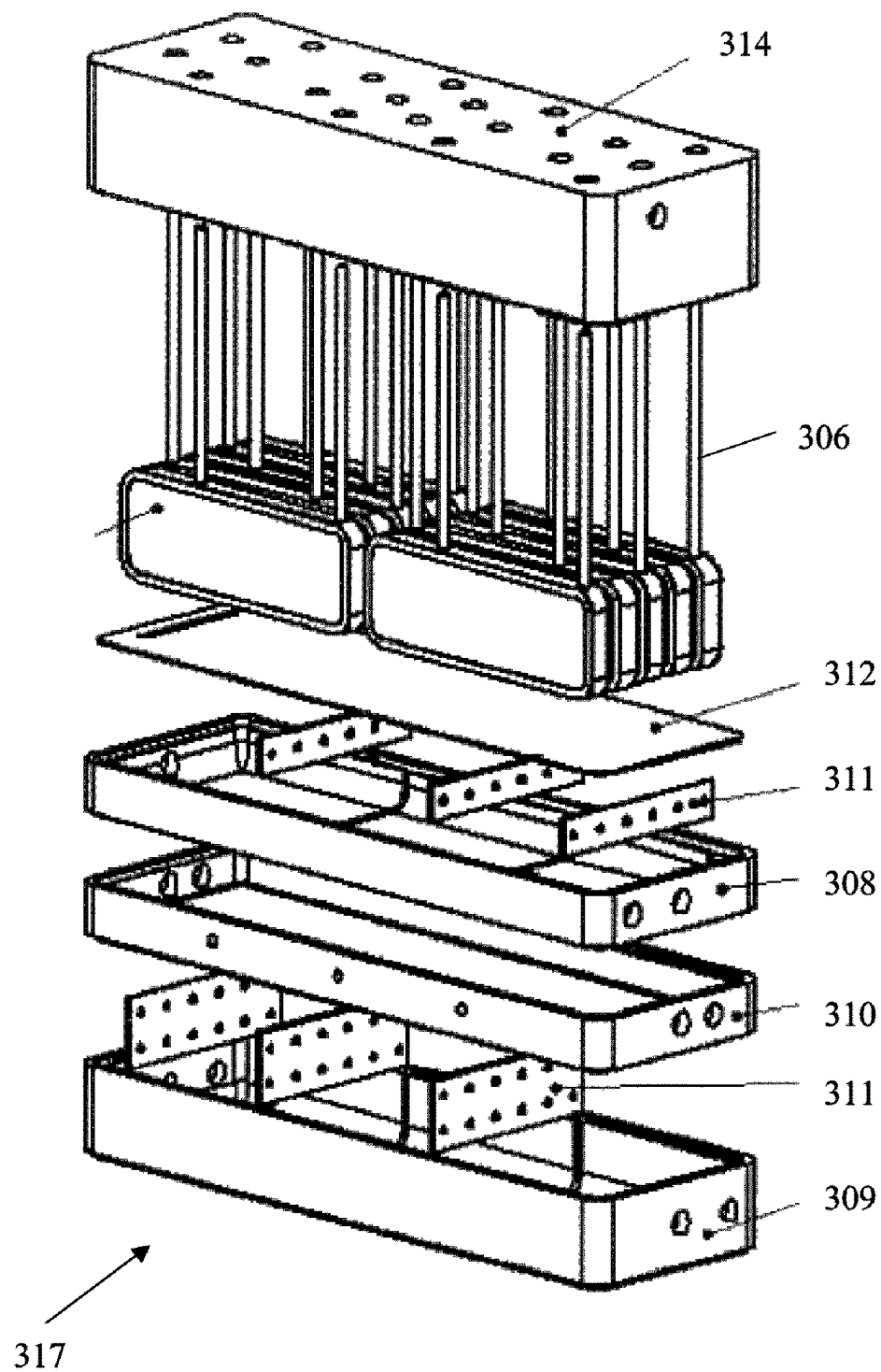
FIG. 40 illustrates an exploded view of a planar membrane reformer containing an array of membrane modules.

FIG. 36 shows an exploded view of a planar hydrogen separation membrane module (300) that contains two membrane surfaces that are available for hydrogen transport. A module, in this exemplary implementation has a substantially hollow metal base (301), perforated plate (302), foil membrane (303), and the frame overlay (304). The parts are held/clamped (temporarily fixed together) firmly so that there are no gaps between components, and all four components on one side of the hollow metal base are preferably sealed simultaneously by sealing around the perimeter. This procedure is repeated for the other side to form a leak tight planar membrane module containing two membrane surfaces. The assembly operation does not require gaskets or adhesives. The preferred method for sealing the module is by laser welding using a fiber laser capable of providing a laser beam with a width of about 30 microns or less. Other sealing methods may include diffusion bonding, seam welding, and electron beam welding. Soldering and brazing are not suitable sealing methods due to the potential for intermetallic diffusion between the sealant (e.g. braze compound) and the membrane material. Prior to assembly, ports (305) and hydrogen outlet tubings shown in FIG. 40 are attached to the base to remove the product high purity hydrogen so that no further fabrication steps are required after sealing the membranes. After sealing, a helium leak test or pressure test may be performed to assess the quality of the seal. For purposes of setting a standard for "leak tight" a module with a helium leak rate less than 1e-6 atm.cc/s is considered to be leak tight. The module footprint as shown is rectangular (FIG. 36) with rounded corners. Preferably, the corners are rounded to reduce overlap of weld areas when sealed using laser welding. Rounded corners are desirable also to eliminate sharp corners as areas of stress concentration. A rectangular shape is not a limitation and those or ordinary skill in the art will recognize that the profile may alternately be flat and square, round, elliptical or any flat shape to enhance the packing density in a membrane reformer (FIG. 40). Packing density is the ratio of the total surface area of the membrane foil to that of the footprint of the reforming chamber (308) housing the modules. The reforming chamber (308) houses the reforming catalyst and the array of planar hydrogen separation membrane modules (400).

Figure 37A:
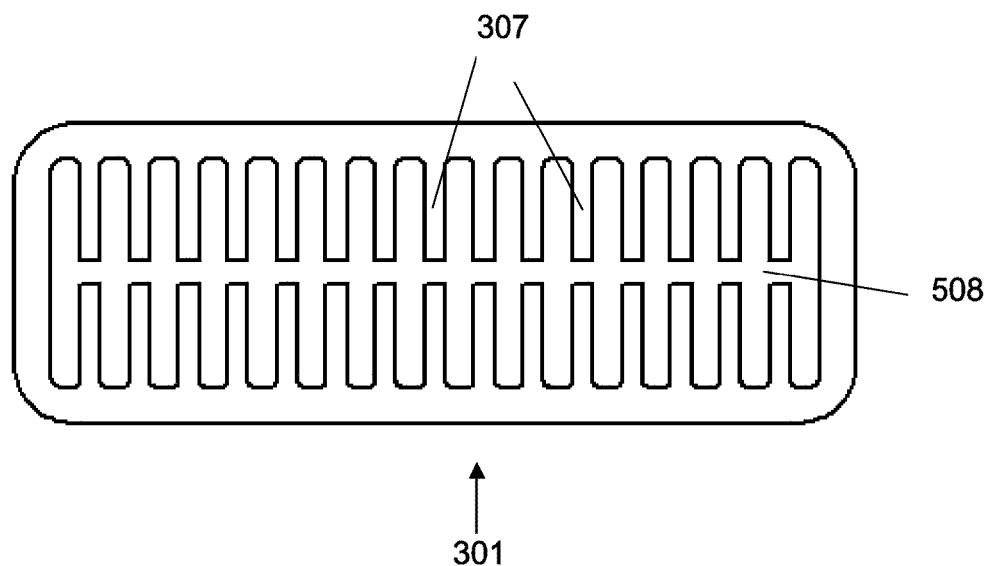
FIGS. 37a and 37b illustrates a substantially hollow metal base.
Figure 37B:
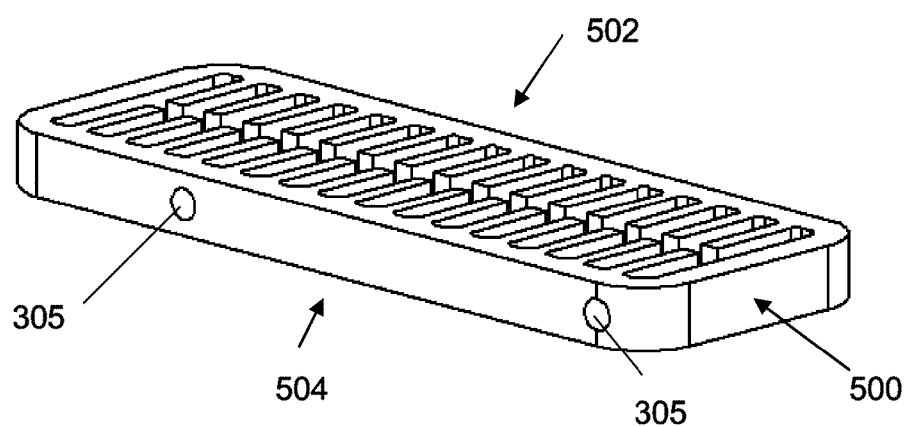

The substantially hollow metal base (FIGS. 37a & 37b) which has an outerwall (500), a top (502) and a bottom (504) serves the function of collecting and equilibrating hydrogen that is transported through both membrane surfaces and providing structural support for the membrane module. To operate at elevated temperatures (about 550° C.-about 720° C. the base (301) must be of adequate thickness to avoid deformation at temperature ranges from about 550° C.-about 750° C. and to operate nominally between about 600° C.-about 700° C. yet provide for fluid communication between the top and bottom sides and support the intermediary support which supports the foil membrane. The base (301) forms finger-like features or solid extensions (307) that extend from the inner sides (506) of the base toward the center of the base creating a hollow region (508) for collecting the hydrogen that is transported through both membrane surfaces. The base with hollow regions also provides structural and/or conformational integrity at the elevated temperatures. Those of ordinary skill in the art will realize that the solid extensions of the base may be shaped in a multitude of ways as long as the spacing in between solid extensions does not exceed a nominal minimum spacing of about 0.125" to maintain its function as a support and such shapes are within the scope of this disclosure. A preferred spacing ranges is from about 0.062" to about 0.125". Although smaller spacing tend to inhibit flow of hydrogen and cause a resistance to hydrogen transport through the membranes depending on the use and other parameters may be acceptable. The two holes serve as ports (305) for withdrawing the hydrogen from the hollow region of the base. Multiple smaller ports may be substituted as long as the fluid cross sectional area remains similar or greater. Alternately, rectangular ports or an open section may be substituted. The ports also serve as the structural connection to the body of the apparatus (FIG. 40) via the hydrogen outlet tubings (306). The ports may be located on the sides of the module as shown in FIG. 37b, on the ends, or in any combination of locations. The dimensions of the base as shown are about 3.5"×1.25"×0.25". These dimensions and the ratio of components is not a limitation. The base may be constructed using techniques which include but are not limited to CNC machining, waterjet, or laser cutting. Preferably, in large volumes, the base is manufactured by casting and is subsequently polished to reduce costs. Important requirements prior to assembly include a finish of about 63 micro inches or better on the top and bottom surfaces, and tight flatness tolerances to minimize any gaps between the perforated plate and base during the welding or bonding process. Failure to have a substantially smooth 63 micro inch or better finish may damage the component in contact therewith. The base may be made thinner than shown, and could use alternate hydrogen outlet porting methods since all forces on the base are compressive, and mechanical strength is not an issue, however deformation and warping must be accounted for and too thin a base at elevated temperature may result in failure.

Figure 38:
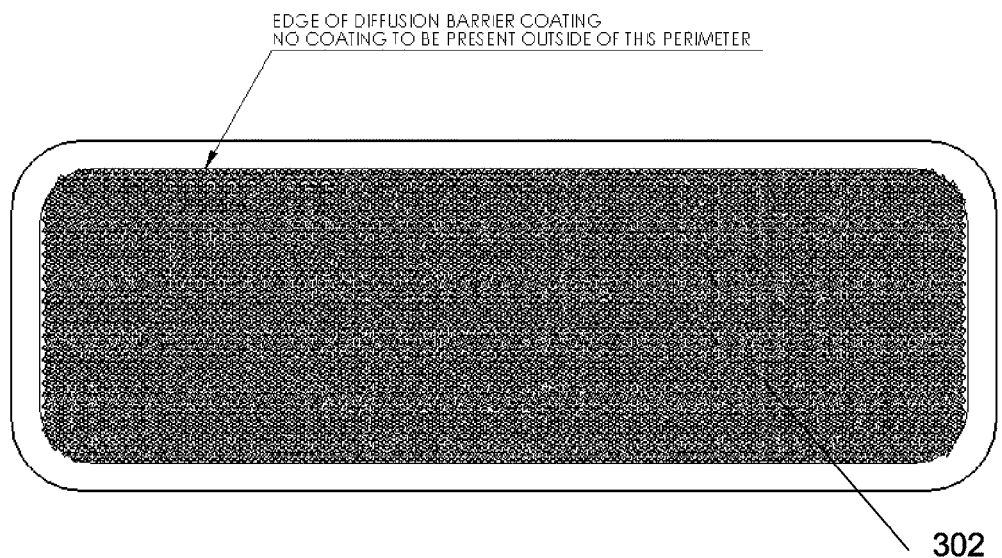
FIG. 38 illustrates an exemplary perforated plate.

The perforated plate (FIG. 38) serves as a porous support for the membrane foil. The perforated plate (302) is sufficiently thin to enable rapid manufacturing while still providing support for the thin membrane foil. The perforated plate contains a sufficient number of small holes to maximize open area while making the holes as small as possible to reduce stress on the overlaying membrane foil. The open hole area is about 35% or more to allow for the hydrogen flow with minimum resistance. Preferably, the open hole area is greater than about 45% of the total surface area of the perforated plate. The preferred hole size is 0.01" to 0.020" with a staggered hole pattern. The hole pattern is square or triangular. A non-perforated perimeter provides a surface for bonding the perforated plate to the base. The surface finish of this region should be about 63 microinches or better to allow for good contact between the plate and the base. The base and the perforated plate work in concert to provide two levels of support. The perforated plate supports the entirety of the active region of the foil membrane and distributes load on that membrane foil (at pressure) evenly to limit damage to the thin membrane. The solid extensions of the base (forming the hollow) actually have the negative effect of reducing the area of the membrane available for H2 transport. However, the reduction is a necessary limit because the solid extensions also provide adequate support for the perforated plate whereby the load on the thin foil and perforated plate combination is distributed evenly enough to limit damage and defects to the thin foil membrane. The outside dimensions of the perforated plate should match up with the support base, and the thickness preferably ranges from about 0.008" to about 0.020".

The perforated plate may be manufactured using processes such as laser drilling or chemical milling. Chemical milling is preferred because it leaves few or no burrs, and requires no follow up processing. The thickness of the plate and the hole arrangement is chosen to provide the ability to handle operating stresses. Since the membrane foil is in intimate contact with the perforated plate, there exists a potential for intermetallic diffusion between the perforated plate and the membrane material. A diffusion barrier coating is therefore applied to the perforated plate to limit or eliminate this diffusion which adversely affects hydrogen transport, lead to the formation of defects, and to failure. Suitable coatings are from about 3 to about 20 microns in thickness, and preferably 8-10 microns in thickness, and are selected from a group consisting of nitrides such as titanium nitride, refractory metals such as tungsten cobalt carbide, or ceramic coatings such as alumina or zirconia, yttria stabilized zirconia (YSZ) or a combination of alumina and zirconia. The plate should be coated with the diffusion barrier with the exception of a margin of about 0.09" to about 0.2" from the edges of the plate, and preferably a margin of about 0.1" from the edges of the plate, to provide an area for sealing during the sealing process. Since a targeted operating temperature of the membrane reformer is about 600 to about 700° C., both sides of the perforated plate (302) can be coated to insure that the walls of the perforations in the plate are suitably covered with the coating.

The hydrogen separation membrane foil (303) selectively separates hydrogen from a hydrogen containing fluid stream. The foil is comprised of alloys of palladium. Preferably, the palladium alloy is about 75 to about 77% Pd and about 23 to about 25% Ag. To minimize costs and improve hydrogen production, the membrane consists of a PdAg alloy foil about 30 microns or less in thickness. Preferably, the thickness of the foil is about 10 to about 30 microns. The bonding surface of the foil should be clean and free from defects to achieve a leak-tight seal. The overall outside dimensions of the foil are about 0.005" less than that of the surface coated perforated plate (302) and the base (301) to minimize the amount of foil exposed around the edges of the module. During assembly, this allows for straightforward fixturing and for a more reliable seal.

Figure 39:
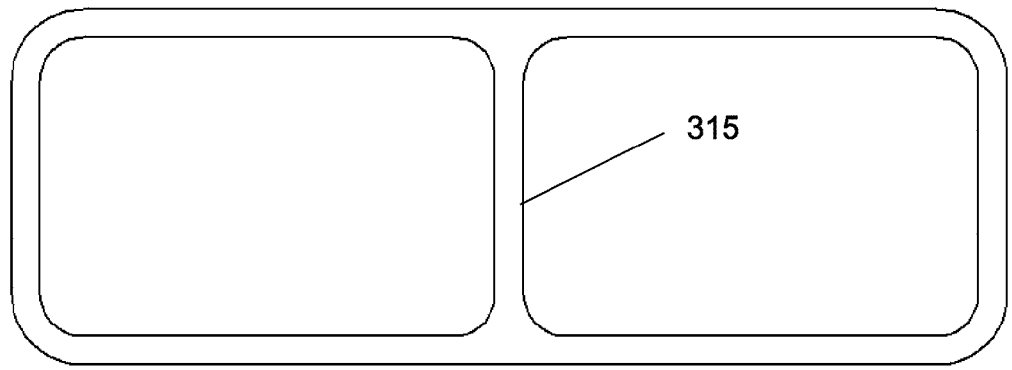
FIG. 39 illustrates an exemplary frame overlay.

The frame overlay (FIG. 39) provides a surface upon which pressure may be applied to the membrane module components during assembly and sealing, and to allow for an assembly process that circumvents contacting the foil and inadvertently causing defects. During sealing using laser welding, the frame overlay (304) provides a suitable surface for the laser beam to contact, since the foil itself is thin and reflective to result in a good weld seal. The overall outside dimensions of the frame are the same as the perforated plate and the base. The width of the frame is nominally about 0.100" to about 0.125". The thickness of the frame is about 0.005" to about 0.010", and preferably about 0.008", and the surface finish is about 63 microinches or better to allow for good contact with the foil. The frame may be manufactured using processes such as laser cutting, punching, stamping, or chemical milling. Chemical milling is preferred since it leaves no burrs and requires no follow up processing. In one aspect, a support rib (315) runs through the center of the frame to provide rigidity and allow for easier build up. No sealing is done along this support rib. If alternate sealing process are employed, it is possible that the frame overlay may be eliminated to result in a further simplified membrane module.

A preferred material of construction for the components of the membrane module except for the membrane foil is Inconel 600 or a similar material with (1) a coefficient of thermal expansion similar to the membrane foil (palladium alloy, preferably Pd/Ag), and (2) good material strength at the targeted operating temperatures of about 600 to about 700° C. Metals of the Stainless Steel series therefore do not yield a reliable membrane module assembly.

The planar hydrogen separation module can contain a hydrogen separation membrane deposited as a coating of a palladium alloy on a diffusion barrier-coated perforated support in lieu of the hydrogen separation membrane foil (303). The deposited membrane, preferably with a thickness of about 10 to about 20 microns, can be deposited using a variety of techniques that include sputtering, electroless plating, electroplating or by applying an ink containing a suitable palladium based alloy by direct write, screen printing or ink jet printing. Additional details regarding deposition of hydrogen separation membranes are disclosed in U.S. application Ser. No. 10/566,334 entitled "Methods for Providing Thin Hydrogen Separation Membranes and Associated Uses", which is herein incorporated by reference in its entirety. The perforated support may consist of the perforated plate (302) or a sintered porous metal welded to a non-porous metal frame. This variation of the planar hydrogen separation membrane module also contains two membrane surfaces that are available for hydrogen transport. Preferably, the palladium alloy is about 75 to about 77% Pd and about 23 to about 25% Ag.

A planar membrane reformer configuration (317) is shown in FIG. 40 as an exemplary means for using a multiplicity of membrane modules in an array form to simultaneously produce hydrogen and separate produced hydrogen as high purity hydrogen. The array consists of two sets of five membrane modules and allows for harvesting of hydrogen through the individual modules. This configuration permits isolation of one or more membrane modules if needed. The membrane reformer in one exemplary implementation contains a reforming chamber (308) and pre-reforming chamber (309) one on each side of the combustion chamber (310). The reforming chamber contains a reforming catalyst and the array of planar membrane modules (400). Some level of pre-reforming (partial reforming of the hydrogen producing fuel to a hydrogen containing fluid stream) may be required to maintain a positive driving force (hydrogen partial pressure difference) between the upstream side of the membrane and the downstream side of the membrane to prevent flow of hydrogen in the reverse direction. Excessive reverse flow of hydrogen across the membrane can damage the membrane module. Baffles (311) are inserted in the reforming and pre-reforming chambers to distribute flow within the reforming and pre-reforming chambers. Although not shown, baffles could also be used in the combustion chamber. A distribution plate (312) in the reforming chamber is used to uniformly distribute the hydrogen containing fluid stream to the array of membrane modules. While the distribution plate is shown to be non-perforated, it preferably contains perforations. The individual membrane modules are attached to the lid (314) by the hydrogen outlet tubings (306) that are connected at the other end to the substantially hollow metal base. High purity hydrogen is withdrawn from the membrane reformer using these tubings. Hydrogen can be withdrawn individually from each membrane module or hydrogen from each module can be collected easily via a manifold that is situated external to the lid.

The reforming chamber (308) and combustion chamber (310) contains a suitable catalyst (not shown in FIG. 40) and comprises a reactor entry port and reject gas port. Combustion is catalytic and is realized in the absence of a flame (flameless combustion) that affords better temperature control in comparison to a flame. Details regarding the reforming and combustion chambers and operation of membrane reformers are disclosed in U.S. application Ser. No. 11/109, 186 entitled "Compact Devices for Generating Pure Hydrogen", which is herein incorporated by reference in its entirety. The membrane reformer is preferably operated at temperatures of up to about 700° C., membrane upstream pressure that ranges between about 70 psig and about 200 psig, and membrane downstream pressure that ranges between about 0.5 bar and about 1.3 bar.

Preferably, the distribution plate is substantially perforated. In a exemplary version of the substantially perforated distribution plate, the first half of the distribution plate is non-perforated (from the reformer inlet), whereas the second half is perforated. Perforations typically consist of ⅛" holes spaced about ½" apart on a non-staggered pattern but may have any number of configurations and hole sizes. The holes may also be progressively greater in size or number to allow more hydrogen bearing gas into the membrane modules. The section of the reforming chamber that contains the non-perforated section of the distribution plate aids in pre-reforming the hydrogen producing fuel to a hydrogen containing fluid stream; in this aspect, the pre-reforming chamber (309) can be replaced by a second reforming chamber (308) thereby increasing the hydrogen production rate (or fuel processing capability) by two-fold.

EXAMPLES

Example 12

Figure 41:
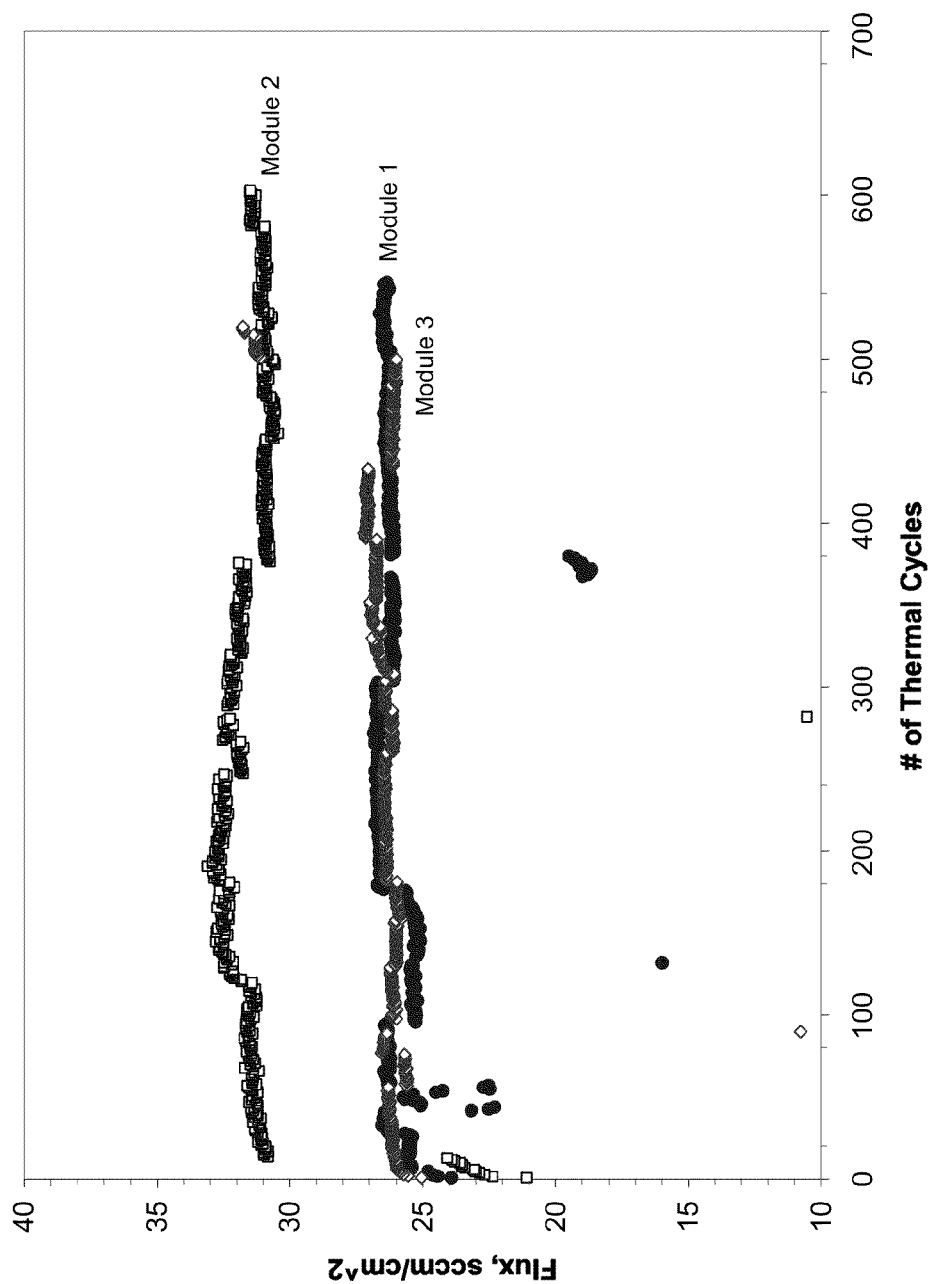
FIG. 41 shows hydrogen flux when membrane modules were subjected to thermal cycling tests at 600° C. using 75% $H_2$/25% $N_2$ feed.

Three planar membrane modules exposed to a common environment [ANAD OKAY?] were constructed as shown in FIG. 36 and with a membrane foil surface area of about 43 cm$^2$ (about 20-about 25 micron thick membranes) were subjected to thermal cycling tests. The modules were housed in a tubular vessel formed using a pipe section and end caps. After purging at ambient temperature with nitrogen gas at 80 psig, the temperature was ramped to 600° C. in about 30 minutes. Nitrogen gas was replaced by 75% $H_2/N_2$ (3500 sccm or feed/area of 81.4 sccm/cm$^2$) and hydrogen flux and purity was measured for 15 minutes. The permeate side was maintained at 9 psig to yield a pressure differential of 70 psig. The gas mixture was then replaced by nitrogen and the vessel was cooled to room temperature in about 1 hour. Thermal cycling was then repeated. FIG. 41 shows the results of three such modules. As can be seen, flux was found to be stable over 500-600 cycles for each of these modules. Purity was also found to be stable at >99.95%. Testing was stopped due to completion of test targets and not due to membrane failure. Due to their demonstrated reliability, the modules are suitable for use in a membrane reformer for production of hydrogen. However, the tubular test vessel is unacceptable as a vessel for the common environment due to the excessive space it occupies and wall thickness required to handle material stresses at the targeted operating temperatures.

Example 13

Figure 42:
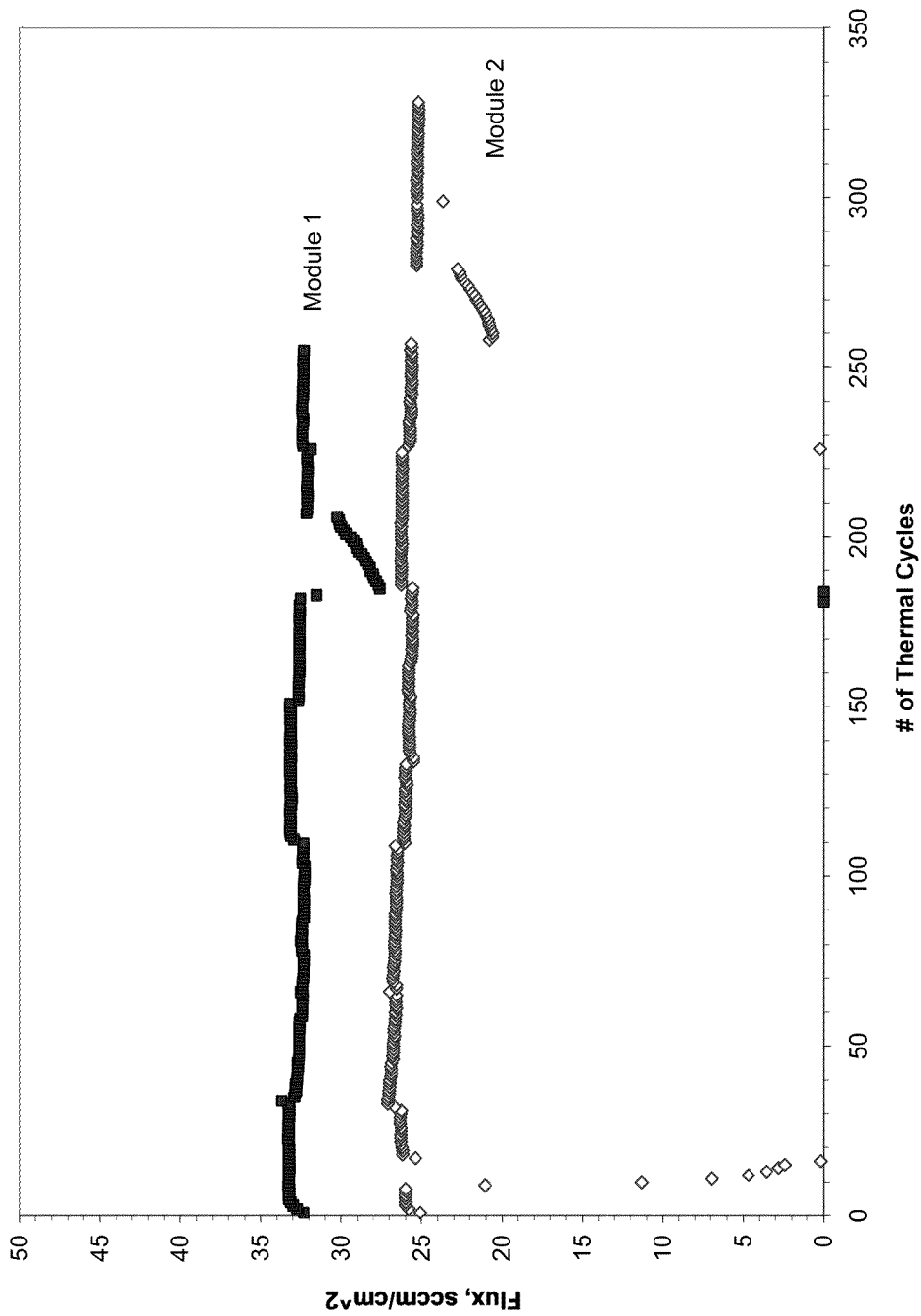
FIG. 42 shows hydrogen flux when membrane modules were subjected to thermal cycling tests at 650° C. using 75% $H_2$/25% $N_2$ feed.

Two other planar membrane modules constructed as shown in FIG. 36 and with a membrane foil surface area of 43 cm$^2$ were subjected to thermal cycling tests using the same procedure as described in Example 12, but at a higher temperature of 650° C. As shown in FIG. 42, hydrogen flux was found to be stable over hundreds of thermal cycles. Testing was stopped due to completion of test targets and not due to membrane failure. Due to their demonstrated reliability, the modules are suitable for use in a membrane reformer for production of high purity hydrogen. The ability of the membrane modules to operate at elevated temperatures in a reliable fashion and it's stable performance is therefore demonstrated.

Example 14

Figure 43:
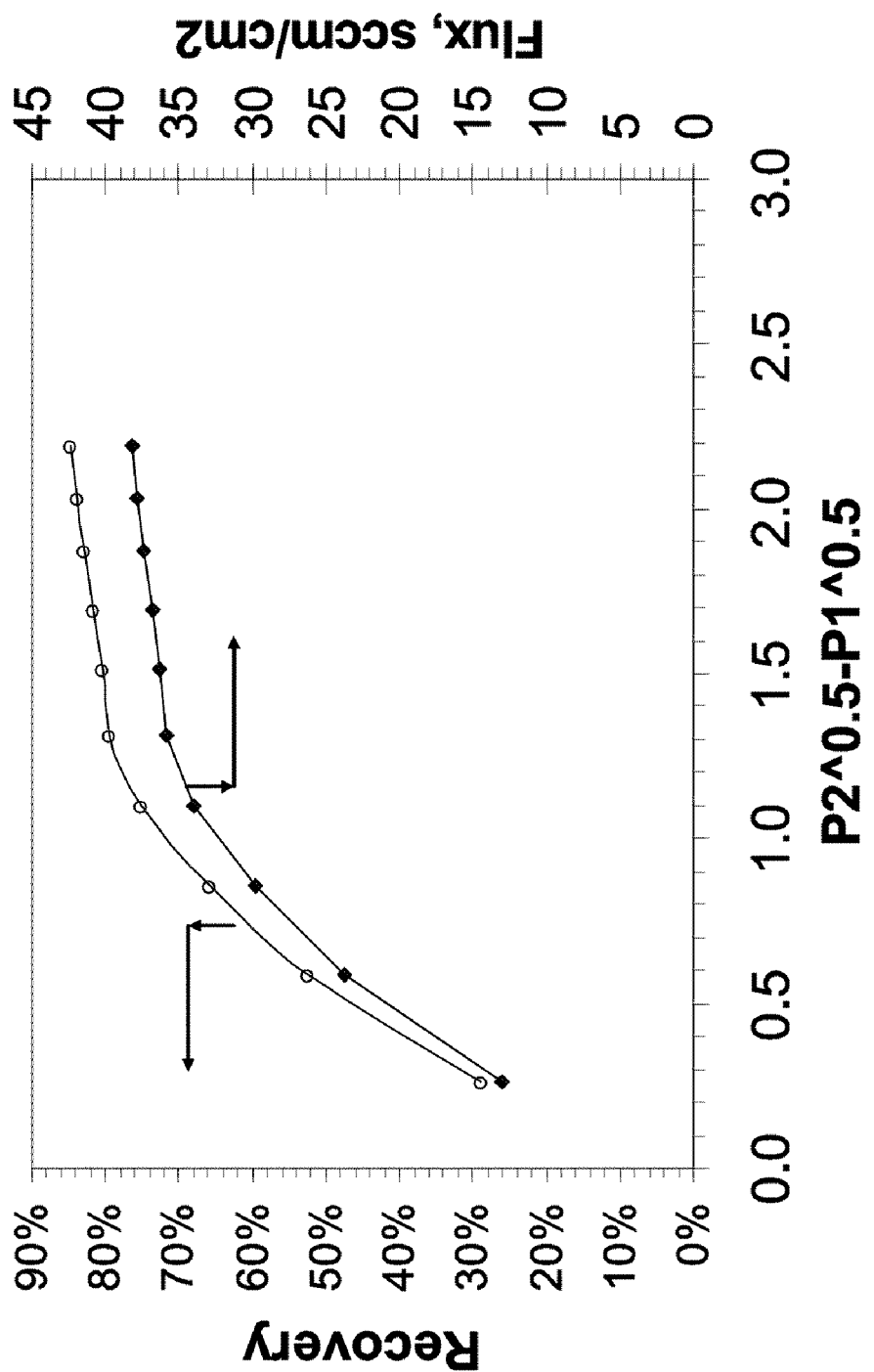
FIG. 43 shows hydrogen flux and recovery when a membrane reformer containing a 10-module array was subjected to permeation tests using 75% $H_2$/25% $N_2$ feed. P2=hydrogen partial pressure upstream of the membrane. P1=hydrogen partial pressure downstream of the membrane

A 10-module array (total membrane area=430 cm$^2$) housed in a common environment (A common environment means fluid communication between the environment which contains the H2 to be captured visa vie the membranes and at least two membrane modules) membrane reformer was constructed as shown in FIG. 40 with the following exception: the first half of the distribution plate (312) from the reformer inlet was non-perforated whereas the second half was perforated. The footprint of the membrane reformer was 20.3 cm (L)×6.5 cm (W) with a surface area of 132 cm$^2$. A membrane area/surface area of 3.25 was achieved, which is an excellent packing density. Perforations in the distribution plate consisted of ⅛" holes spaced ½" apart on a square pattern. The membrane reformer was subjected to hydrogen permeation tests using 75% $H_2$/25% $N_2$ feed while the membrane upstream pressure was changed from 205 to 25 psig and while the membrane downstream pressure was changed from 5 psig to 0.5 bar (vacuum). The average operating temperature was 560-600° C. and heat was provided by the catalytic combustion of propane. At a feed/area value of 60 sccm/cm$^2$, FIG. 43 (Sievert's plot) shows the flux and recovery (hydrogen recovered/hydrogen in the feed) that was measured. The results showed that the ten modules arranged in an array configuration was capable of operating over aggressive operating conditions, and was found to be reliable. At an X-axis value of 1, flux was comparable to that measured using the single modules demonstrating scalability as an array.

Example 15

The membrane reformer of Example 38 was used for reforming ethanol/water feed with a S/C ratio of 4.5 at 600-670° C., membrane upstream pressure of 150-155 psig and downstream pressure of 0.5 bar. Space velocity (GHSV) was calculated based on the volume of catalyst in both the reforming and in the pre-reforming chambers. Representative results from this test are summarized below:

|  | Th. equilibrium | Data 1 | Data 2 |
| --- | --- | --- | --- |
| H2/EtOH, mol/mol | 2.9 | 3.53 | 3.09 |
| Flux, sccm/cm2 |  | 12.1 | 12.9 |
| GHSV, per h |  | 2300 | 2768 |
| Feed/area, sccm/cm2 |  | 34.8 | 41.7 |
| H2 recovery, % |  | 88 | 84 |
| Conversion, % | 69 | 80 | 73 |

As can be seen, an enhancement in conversion and hydrogen yield (mol/mol; for the equilibrium calculation, 90% recovery was assumed) was measured over that corresponding to thermodynamic equilibrium. Hydrogen recovery is defined as the ratio of the flow rates of high purity hydrogen to the sum of the flow rate of high purity hydrogen and hydrogen in the hydrogen depleted stream (24). This result demonstrates that simultaneous realization of hydrogen generation and hydrogen separation in a membrane reformer permits higher hydrocarbon conversions and hydrogen yields over that anticipated by thermodynamic equilibrium. The performance of the membrane reformer that contains the array of membrane modules was demonstrated.

Example 16

A membrane reformer similar to that used in Example 14 was used for reforming propane with a S/C ratio of 2.7 at 500-600° C., membrane upstream pressure of 70 psig and downstream pressure of 0.5 bar. Representative results from this test are summarized below:

|  | Th. Equilibrium | Data 1 | Data 2 | Data 3 |
| --- | --- | --- | --- | --- |
| H2/C3, mol/mol | 2.1 | 3.88 | 3.63 | 3 |
| Flux, sccm/cm2 |  | 11.61 | 13.47 | 13.83 |
| GHSV, per h |  | 2000 | 2500 | 3000 |
| Feed/area, sccm/cm2 |  | 27.1 | 33.9 | 41.9 |
| H2 recovery, % |  | 74.6 | 71.4 | 66.9 |
| Conversion, % | 41.3 | 57.9 | 58.32 | 55.6 |

Figure 44:
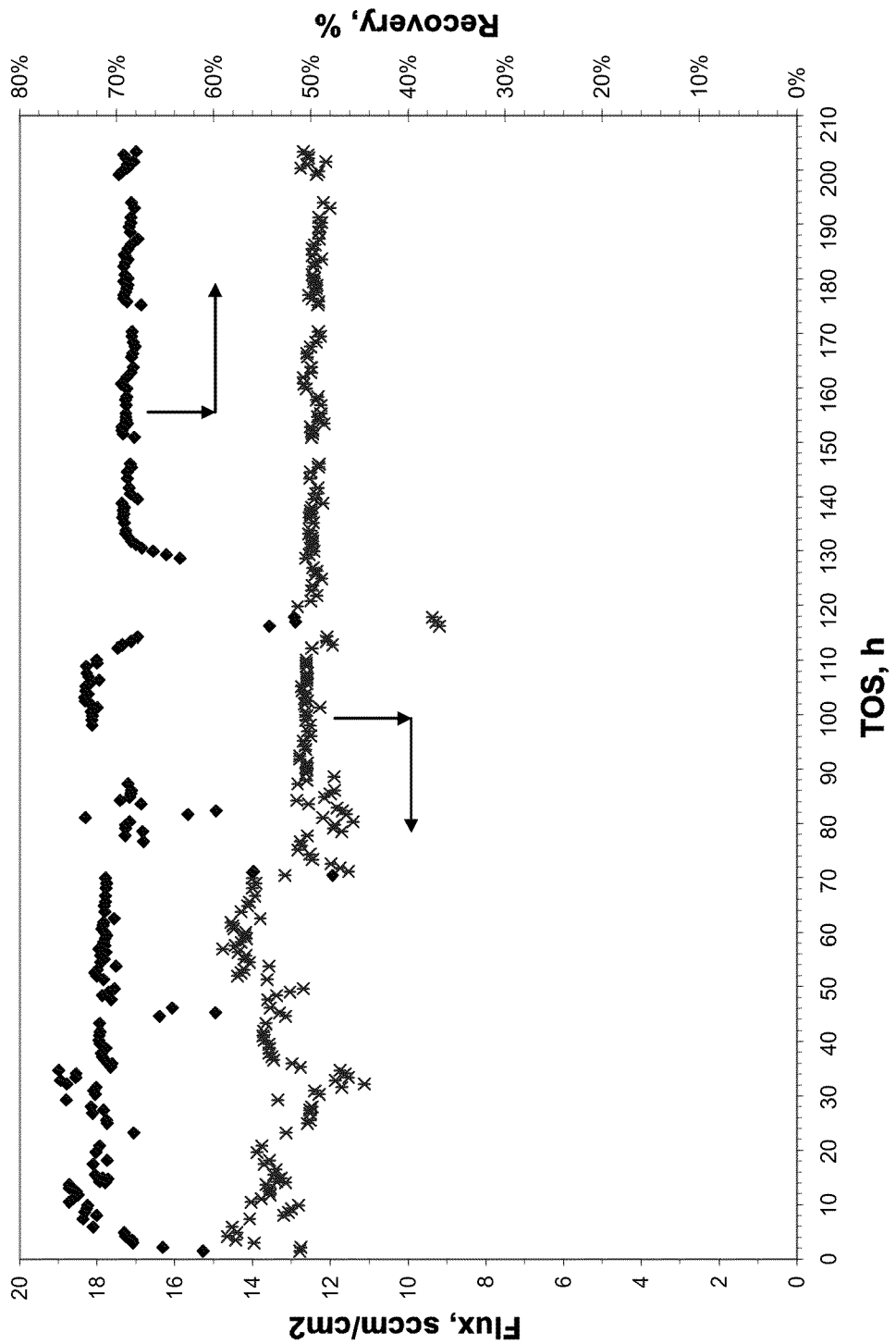
FIG. 44 shows hydrogen flux and recovery when a membrane reformer containing a 10-module array was subjected to propane steam reforming.
Figure 47:
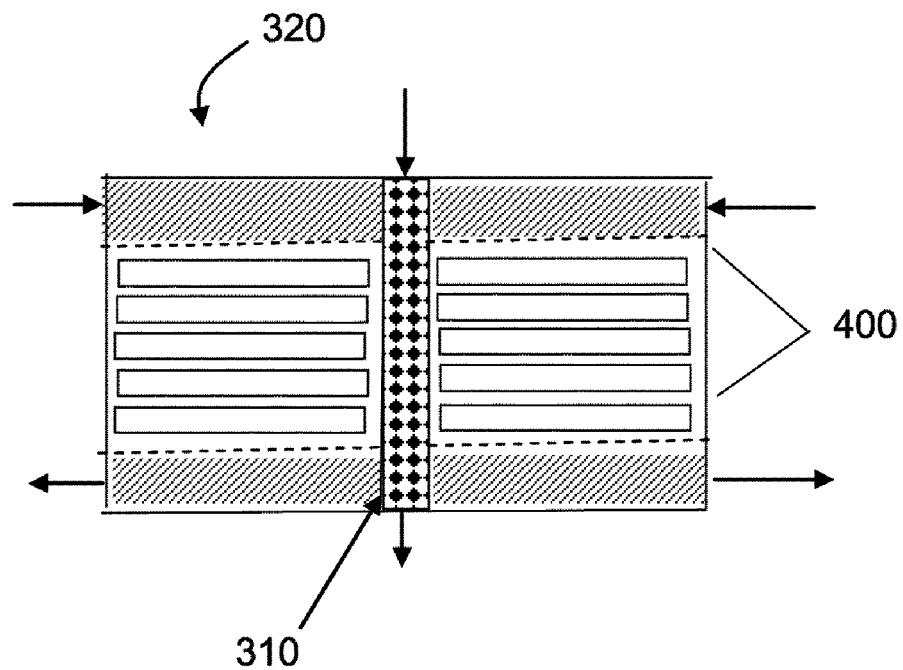
Figure 48:
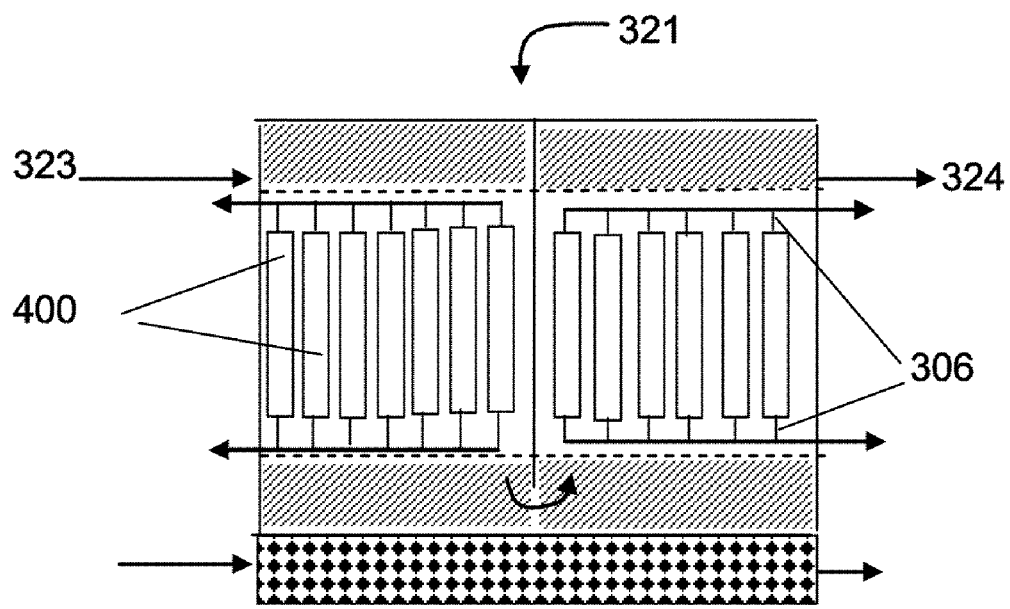

As can be seen, an enhancement in conversion and hydrogen yield (mol/mol; for the equilibrium calculation, 75% recovery was assumed) was measured over that corresponding to thermodynamic equilibrium. This result also demonstrates that simultaneous realization of hydrogen generation and hydrogen separation via a membrane reformer permits higher hydrocarbon conversions and hydrogen yields over that anticipated by thermodynamic equilibrium. This example also demonstrates the fuel flexibility of the membrane reformer. The hydrogen purity during this test was 99.95%. FIG. 44 shows hydrogen flux and recovery that was measured during the course of a test that lasted 200 h while the space velocity was varied between 2000-3000 h$^{-1}$. Stable flux and recovery were observed during this test.

The planar hydrogen separation membrane modules (400) can be arrayed in a variety of configurations generally based on the type of the hydrogen producing fuel, and other requirements such as of scalability, footprint, turndown (limiting hydrogen output below which thermal efficiency would suffer), operating conditions, and cost. FIGS. 45-48 show four exemplary configurations (318-321). Configuration (318) is beneficial for light hydrocarbon reforming that would benefit from membrane reformer operation at low space velocity (ratio of feed flow rate to reforming catalyst volume). The hydrogen producing fuel (322) contacts a reforming catalyst (322) in the reforming chamber, is partially reformed, and is distributed through the substantially perforated distribution plate (312) to contact the first array of modules. Separated hydrogen is withdrawn through the hydrogen outlet tubings of the modules that are located along the width (W) direction of the membrane reformer. Further conversion of the reformed gas to hydrogen occurs over a reforming catalyst downstream of the first array of membrane modules, and the hydrogen containing fluid stream is diverted to contact the second array of modules by the baffle (311). After additional harvesting of hydrogen using the second array of modules, the hydrogen depleted stream (324) exits the reforming chamber. Heat required for reforming is provided by catalytic combustion in the combustion chamber (310) that adjoins the reforming chamber. Although not shown, the fuel to the combustion chamber that contains a suitable catalyst (325) is selected from the group consisting of the fuel to the reforming chamber, a separate supplemental fuel or the hydrogen depleted exit stream (324).

The number of modules in an array can be varied as required. Five modules are shown in an array in configuration (318) as an example only and not a limitation. The direction of fluid flow in the catalytic combustion chamber (310) is also shown as an example only. Preferably, the feed to the catalytic combustion chamber is distributed along the width of the chamber (W direction in FIGS. 45-48).

In configuration (319), the feed (323) is split and fed to the reforming chamber and the hydrogen depleted gas streams (324) are combined later (not shown). This configuration is more favorable for applications that require frequent turndown. Configuration (320), is similar to (319), but the combustion chamber is sandwiched between the reforming chambers that contain a reforming catalyst and the array of membrane modules.

In these exemplary reformer configurations, the empty spaces around the array of the planar membrane modules in the reforming chamber can also be filled with a reforming catalyst (322) if needed to improve hydrocarbon conversion to hydrogen. The dimensions (length, width) of the planar hydrogen separation module is chosen to satisfy the requirements of a particular membrane reformer design and application; however, a preferable length to width ratio is about 3.

In configuration (321), the orientation of the membrane modules (400) has been changed to a vertically oriented array to afford a different porting method for the hydrogen outlet tubings (306).

Different reforming catalysts can be used in different regions of the reforming chamber. For example, the catalyst used for pre-reforming the hydrogen producing fuel to a hydrogen containing fluid stream can be different from that which is used elsewhere in the reforming chamber. The throughput of the planar membrane reformer can be increased (up-scaling) by simply using multiplicity of a reforming chambers and combustion chambers (310).

We claim:

1. A hydrogen separation unit with an array of planar members in a shared environment, comprising:
    a planar base with a top, bottom and outer side wall, the base having a plurality of solid extensions reaching inward from at least one side wall of the base forming a hollow region of channels within the base, wherein the hollow region is fluidly connected to one or more outlet port;
    a plurality of surface coated perforated plates containing a plurality of perforations having size between 0.01" and 0.02";
    said plurality of plates contain thickness of between 0.008" and 0.02";
    each of said plurality of plates contains open areas greater than 45%, and
    each of said perforated plates contains a surface coating except for a margin of between 0.09" and 0.2" from edges of said plates, wherein the surface coating is selected from said group consisting of titanium nitride, tungsten cobalt carbide, alumina, zirconia, yttria stabilized zirconia, and wherein the surface coating is of a thickness of between 3 and 20 microns;
    a plurality of planar hydrogen separation membranes in fluid communication with each other, such that the plurality of hydrogen separation membranes have a shared environment; and,
    a plurality of frames;
    wherein each of said perforated plates is disposed on a corresponding one of said top and bottom of said base and between said base and a corresponding one of said plurality of hydrogen separation membranes, and
    wherein each of said plurality of hydrogen separation membranes is disposed between a corresponding one of said plurality of perforated plates and a corresponding one of said plurality of frames.

2. The unit of claim 1, wherein hydrogen that is transported through the plurality of hydrogen separation membranes is collected in said hollow region of said base and routed out as high purity hydrogen through at least one outlet port.

3. The unit of claim 1, wherein each of said plurality of frames contains a central rib.

4. The unit of claim 1 wherein said base is made of Inconel 600 with a surface finish of about 63 micro inches or smoother.

5. The unit of claim 1 wherein spacing between said solid extensions is between about 0.062" and about 0.125".

6. A hydrogen separation unit with an array of planar members in a shared environment, comprising:
    a planar base with a top, bottom and outer side wall, the base having a plurality of solid extensions reaching inward from at least one side wall of the base forming a hollow region of channels within the base, wherein the hollow region is fluidly connected to one or more outlet port;

a plurality of surface coated perforated plates;

a plurality of planar hydrogen separation membranes each of said plurality of hydrogen separation membranes is a foil of an alloy of palladium with a thickness of 10-30 microns; and said length and width of said foil is 0.005" less than that of said base in fluid communication with each other, such that the plurality of hydrogen separation membranes have a shared environment; and, a plurality of frames;

wherein each of said perforated plates is disposed on a corresponding one of said top and bottom of said base and between said base and a corresponding one of said plurality of hydrogen separation membranes, and wherein each of said plurality of hydrogen separation membranes is disposed between a corresponding one of said plurality of perforated plates and a corresponding one of said plurality of frames.

7. The unit of claim 6 wherein said alloy of palladium consists of 75-77% palladium, and 23-25% silver.

8. A planar hydrogen separation membrane module, comprising:

a rectangular metal base having a hollow region, rounded corners, at least two outlet ports and at least two hydrogen outlet tubings;

a perforated plate with a thickness of 0.008" to 0.020" disposed on either side of said base, said plate containing 0.01" to 0.02" perforations, and containing a surface coating from said group consisting of titanium nitride, tungsten cobalt carbide, alumina, zirconia, yttria stabilized zirconia of thickness 8-10 microns that covers said plate with said exception of a margin of 0.1" from said edges of said plate;

a 10 to 30 micron thick Pd/Ag hydrogen separation membrane foil disposed on said surface of said perforated plates that is not in contact with said base;

a frame of thickness 0.008" disposed on said surface of said foils that is not in contact with said hydrogen separation membrane foil;

wherein said base, said perforated plate and said frame made of Inconel 600 with a surface finish of 63 micro inches or smoother; and, wherein said perforated plate, said hydrogen separation membrane foil, and said frame are combined with a leak tight seal from laser welding.

* * * * *